(12) United States Patent
Ozaki et al.

(10) Patent No.: US 8,439,568 B2
(45) Date of Patent: May 14, 2013

(54) WHEEL SUPPORT BEARING ASSEMBLY EQUIPPED WITH SENSOR

(75) Inventors: Takayoshi Ozaki, Iwata (JP); Tomomi Ishikawa, Iwata (JP); Kentarou Nishikawa, Iwata (JP)

(73) Assignee: NTN Corporation, Osaka (JP)

( * ) Notice: Subject to any disclaimer, the term of this patent is extended or adjusted under 35 U.S.C. 154(b) by 1115 days.

(21) Appl. No.: 12/310,444

(22) PCT Filed: Aug. 21, 2007

(86) PCT No.: PCT/JP2007/000890
§ 371 (c)(1),
(2), (4) Date: Feb. 25, 2009

(87) PCT Pub. No.: WO2008/026305
PCT Pub. Date: Mar. 6, 2008

(65) Prior Publication Data
US 2009/0324152 A1   Dec. 31, 2009

(30) Foreign Application Priority Data

| Aug. 25, 2006 | (JP) | 2006-228906 |
|---|---|---|
| Aug. 25, 2006 | (JP) | 2006-228907 |
| Aug. 25, 2006 | (JP) | 2006-228908 |
| Aug. 28, 2006 | (JP) | 2006-230100 |
| Aug. 28, 2006 | (JP) | 2006-230101 |

(51) Int. Cl.
*F16C 19/08* (2006.01)
*F16C 41/00* (2006.01)
*G01B 7/16* (2006.01)
*G01P 3/443* (2006.01)

(52) U.S. Cl.
USPC ............. 384/448; 384/446; 384/544; 73/781

(58) Field of Classification Search ................. 384/448,
384/504, 544, 586, 607, 446; 73/773–774,
73/781–782, 862.381–862.382, 862.473–862.474;
324/173, 174, 207.25
See application file for complete search history.

(56) References Cited

U.S. PATENT DOCUMENTS 4,311,980 A * 1/1982 Prudenziati ..................... 338/4
5,129,743 A   7/1992 Faye et al.
(Continued)

FOREIGN PATENT DOCUMENTS
CN   1455233 A   11/2003
EP   1221589 A2 * 7/2002
(Continued)

OTHER PUBLICATIONS

English Translation of the International Report on Patentability issued Mar. 12, 2009 in corresponding International Patent Application PCT/JP2007/000890.

(Continued)

*Primary Examiner* — Marcus Charles

(57) ABSTRACT

In a wheel support bearing assembly including double row rolling elements between an outer member and an inner member, a sensor unit is fitted to one of the outer and inner members, which serves as a stationary member. The sensor unit is made up of a sensor mounting member and at least one or more strain sensors fitted to the sensor mounting member. A sensor signal processing circuit to process an output signal from the strain sensor is provided in the sensor mounting member.

13 Claims, 23 Drawing Sheets

U.S. PATENT DOCUMENTS

| | | | |
|---|---|---|---|
| 5,140,849 A | 8/1992 | Fujita et al. | |
| 5,143,458 A | 9/1992 | Alff et al. | |
| 5,385,411 A | 1/1995 | Shirai et al. | |
| 5,974,665 A | 11/1999 | Frielingsdorf et al. | |
| 5,997,182 A | 12/1999 | Brown | |
| 6,098,469 A * | 8/2000 | Nicot | 73/862.55 |
| 6,109,793 A | 8/2000 | Miyazaki | |
| 6,343,878 B1 * | 2/2002 | Ouchi | 384/448 |
| 6,354,952 B1 | 3/2002 | Boulton et al. | |
| 6,386,553 B2 * | 5/2002 | Zetterstrom | 280/5.51 |
| 6,406,186 B1 | 6/2002 | Torii et al. | |
| 6,588,119 B1 * | 7/2003 | Russell et al. | 33/517 |
| 6,615,669 B1 * | 9/2003 | Nishimura et al. | 73/756 |
| 6,626,581 B2 | 9/2003 | Uchman | |
| 6,701,780 B2 * | 3/2004 | Hofmann et al. | 73/146 |
| 6,715,926 B2 | 4/2004 | Tajima et al. | |
| 6,802,208 B2 | 10/2004 | Chinitz et al. | |
| 7,108,427 B2 | 9/2006 | Joki et al. | |
| 7,197,944 B2 | 4/2007 | Koyagi et al. | |
| 7,212,927 B2 | 5/2007 | Yanagisawa et al. | |
| 7,320,257 B2 | 1/2008 | Takizawa et al. | |
| 7,452,133 B2 | 11/2008 | Ohtsuki et al. | |
| 2001/0030400 A1 * | 10/2001 | Zetterstrom | 280/5.51 |
| 2002/0097040 A1 | 7/2002 | Takizawa et al. | |
| 2002/0118899 A1 | 8/2002 | Torii et al. | |
| 2003/0218548 A1 | 11/2003 | Sato et al. | |
| 2003/0218598 A1 * | 11/2003 | Shibata | 345/161 |
| 2004/0074317 A1 | 4/2004 | Colombo et al. | |
| 2005/0016296 A1 | 1/2005 | Inoue | |
| 2005/0222740 A1 | 10/2005 | Inoue et al. | |
| 2006/0169052 A1 * | 8/2006 | Mattmann et al. | 73/777 |
| 2007/0014500 A1 | 1/2007 | Iwamoto et al. | |
| 2007/0157742 A1 | 7/2007 | Kouduki et al. | |
| 2008/0285901 A1 | 11/2008 | Koike et al. | |
| 2009/0038414 A1 | 2/2009 | Ozaki et al. | |
| 2009/0080822 A1 | 3/2009 | Ozaki et al. | |
| 2009/0097791 A1 | 4/2009 | Ozaki et al. | |
| 2009/0114004 A1 | 5/2009 | Ozaki et al. | |
| 2009/0120184 A1 | 5/2009 | Ozaki et al. | |
| 2009/0129712 A1 | 5/2009 | Ozaki et al. | |
| 2010/0135604 A1 | 6/2010 | Ozaki et al. | |

FOREIGN PATENT DOCUMENTS

| | | | |
|---|---|---|---|
| JP | 55-156608 A | | 12/1980 |
| JP | 59-023889 B | | 6/1984 |
| JP | 05060660 A | * | 3/1993 |
| JP | 2531492 | | 1/1997 |
| JP | 9-61268 | | 3/1997 |
| JP | 2001-253206 | | 9/2001 |
| JP | 2002-340922 | | 11/2002 |
| JP | 2003-262548 A | | 9/2003 |
| JP | 2003-278778 | | 10/2003 |
| JP | 2003-530565 | | 10/2003 |
| JP | 2003-336653 | | 11/2003 |
| JP | 2004-3601 | | 1/2004 |
| JP | 2004-69071 | | 3/2004 |
| JP | 2004-142577 | | 5/2004 |
| JP | 2004-155261 | | 6/2004 |
| JP | 2004-198247 | | 7/2004 |
| JP | 2004-360782 | | 12/2004 |
| JP | 2005-049159 A | | 2/2005 |
| JP | 2005-077388 A | | 3/2005 |
| JP | 2005-265175 | | 9/2005 |
| JP | 2006-3268 | | 1/2006 |
| JP | 2006-10477 | | 1/2006 |
| JP | 2006-77807 | | 3/2006 |
| JP | 2006-98258 | | 4/2006 |
| JP | 2006258241 A | * | 9/2006 |
| JP | 2007032705 A | * | 2/2007 |
| JP | 2007-71280 | | 3/2007 |
| JP | 2007057301 A | * | 3/2007 |
| WO | 01/77634 A2 | | 10/2001 |
| WO | 2004/018273 A1 | | 3/2004 |
| WO | 2004/045933 A | | 6/2004 |

OTHER PUBLICATIONS

Japanese Decision of Rejection mailed Mar. 6, 2012 issued in corresponding Japanese Patent Application No. 2006-228906.
U.S. Office Action mailed Feb. 2, 2011 in related U.S. Appl. No. 12/086,153.
European Search Report dated Apr. 29, 2011 in a related European Patent Application 06832738.6.
European Search Report dated May 11, 2011 in a related European Patent Application 07713561.4.
Japanese Notification of Reason(s) for Rejection issued Nov. 1, 2011 in a related non-priority Japanese Patent Application No. 2006-227686.
European Office Action dated Dec. 29, 2011 issued in related European Patent Application No. 07713561.4.
U.S. Appl. No. 12/224,846, filed Sep. 8, 2008, Ozaki et al., NTN Corporation.
Japanese Notification of Reason(s) for Rejection issued Oct. 11, 2011 in corresponding Japanese Patent Application 2006-228906.
U.S. Notice of Allowance mailed Sep. 28, 2010 in related U.S. Appl. No. 12/086,089.
U.S Notice of Allowance mailed Aug. 25, 2010 in related U.S. Appl. No. 12/224,846.
International Search Report for International Application No. PCT/JP2007/000890, mailed Nov. 27, 2007.
U.S. Notice of Allowance mailed May 17, 2011 in related U.S. Appl. No. 12/086,153.
Japanese Notification of Reason(s) for Rejection issued Aug. 9, 2011 in related Japanese Patent Application 2005-354245.
Japanese Notification of Reason(s) for Rejection issued Aug. 9, 2011 in related Japanese Patent Application 2005-358589.
Japanese Office Action issued Sep. 11, 2012 in corresponding Japanese Patent Application No. 2005-354246.

* cited by examiner

WHEEL SUPPORT BEARING ASSEMBLY EQUIPPED WITH SENSOR

CROSS REFERENCE TO THE RELATED APPLICATIONS

This application claims the benefit under 35 U.S.C. Section 371, of International Application No. PCT/JP2007/000890, filed Aug. 21, 2007, which claimed priority to the following applications:

Japanese Application No. 2006-228906, filed Aug. 25, 2006;

Japanese Application No. 2006-228907, filed Aug. 25, 2006;

Japanese Application No. 2006-228908, filed Aug. 25, 2006;

Japanese Application No. 2006-230100, filed Aug. 28, 2006;

Japanese Application No. 2006-230101, filed Aug. 28, 2006 in the Japanese Patent Office, the disclosures of all of which are hereby incorporated by reference.

BACKGROUND OF THE INVENTION

1. Field of the Invention

The present invention relates to a sensor equipped wheel support bearing assembly having a load sensor built therein for detecting a load imposed on a bearing unit rotatably supporting a vehicle wheel.

2. Description of the Prior Art

For safety travel of an automotive vehicle, the wheel support bearing assembly equipped with a sensor for detecting the rotational speed of each of vehicle wheels has hitherto been well known in the art. While the automobile traveling safety precaution is generally taken by detecting the rotational speed of the respective vehicle wheel in various locations, it is not sufficient with only the rotational speed of the vehicle wheel and, therefore, it is desired to achieve a control for safety purpose with the use of other sensor signals.

In view of the above, it may be contemplated to achieve the vehicle attitude control based on a load acting on each of the wheels during travel of an automotive vehicle. By way of example, a large load acts on the outside wheels during the cornering, on the wheels on one side during the run along left and right inclined road surfaces or on the front wheels during the braking, and, thus, an equal load does not act on each of the vehicle wheels. Also, even in the case of the uneven live load, the loads acting on those wheels tend to become uneven. For this reason, if the loads acting on the wheels can be detected as needed, suspension systems for the vehicle wheels can be controlled beforehand based on results of detection of the loads so that the attitude control of the automotive vehicle during the traveling thereof (for example, prevention of a rolling motion during the cornering, prevention of diving of the front wheels during the braking, and prevention of diving of the vehicle wheels brought about by an uneven distribution of live loads) can be accomplished. However, no space for installation of the load sensor for detecting the load acting on the respective vehicle wheel is available and, therefore, the attitude control through the detection of the load can hardly be realized.

Also, in the event in the near future the steer-by-wire is introduced and the system, in which the wheel axle and the steering come not to be coupled mechanically with each other, is increasingly used, information on the road surface comes to be required to transmit to the steering wheel by detecting a wheel axis direction load.

In order to meet those needs hitherto recognized, the Japanese Published International Application No. 2003-530565 suggests a wheel support bearing assembly, in which a strain gauge is affixed to an outer ring of the wheel support bearing assembly for the purpose of detecting strains.

An outer ring of the wheel support bearing assembly is a bearing component part having a rolling surface defined therein and required to have a strength, which bearing component part is manufactured through complicated process steps including, for example, a plastic forming, a turning process, a heat treatment and a grinding process. Accordingly, where a strain gauge is attached to the outer ring such as disclosed in the prior art document referred to above, there is a problem in that the productivity is low and the cost of manufacture thereof during a mass production tends to become high. Also, it is not easy to detect a strain occurring in the outer ring with high sensitivity and, when a result of such detection is utilized in controlling the vehicle attitude of an automotive vehicle then traveling, a problem will arise in association with the accuracy of the control.

In view of the foregoing, attempts have been made to secure a strain sensor to a sensor mounting member to form a sensor unit, which is in turn fitted to a peripheral surface of the outer member. In such case, when a sensor signal processing circuit for processing an output from the strain sensor is provided in the wheel support bearing assembly, the wiring from the strain sensor to the sensor signal processing circuit can be simplified as compared with the case in which the sensor signal processing circuit is provided in an electric control unit (ECU) of an automotive vehicle. However, since no extra space is available in the wheel support bearing assembly and, therefore, the position for installation is limited, a problem is encountered with as to how and where the sensor signal processing circuit is installed in the wheel support bearing assembly. In addition, it is a prime concern and is keenly desired to provide the sensor signal processing circuit with high productivity and inexpensively and also to avoid reduction in assemblability of the sensor unit.

SUMMARY OF THE INVENTION

An object of the present invention is to provide a sensor equipped wheel support bearing assembly of a type, in which the load detecting sensor and the sensor signal processing circuit for processing the output from the load detecting sensor can be compactly installed, in which the load acting on a vehicle wheel can be detected with high sensitivity and the output from the sensor can be effectively utilized in vehicle control of the automotive vehicle, and which can be mass-produced at an inexpensive cost and with high assemblability.

The sensor equipped wheel support bearing assembly according to the present invention is for rotatably supporting a vehicle wheel relative to a vehicle body structure and includes an outer member having an inner periphery formed with double row rolling surfaces, an inner member having rolling surfaces formed therein in face-to-face relation with the rolling surfaces in the outer member, double row rolling elements interposed between those opposed rolling surfaces, and a sealing device for sealing each of opposite ends of a bearing space delimited between the outer member and the inner member. A sensor unit having a sensor mounting member and at least one or more strain sensors fitted to the sensor mounting member is fitted to one of the outer and inner members, which serves as a stationary member, and a sensor signal processing circuit for processing an output signal from the strain sensor is provided in the sensor mounting member. The sensor signal processing circuit referred to above may be formed in a sensor signal processing circuit substrate, which is in turn fitted to the sensor mounting member.

In the event that a load acts on the rotatable member as the automotive vehicle starts traveling, the stationary member undergoes deformation through the rolling elements and such deformation brings about a strain in the sensor unit through the mounting member. The strain sensor provided in the sensor unit detects the strain occurring in the sensor unit. If the relation between the strain and the load is determined beforehand by means of a series of experiments and/or simulations, the load imposed on the vehicle wheel can be detected from an output of the strain sensor. Also, the load so detected is processed by the sensor signal processing circuit and is then utilized to control an automotive vehicle.

Since the wheel support bearing assembly of the present invention is of a design, in which the sensor unit including the sensor mounting member and the strain sensor fitted to the sensor mounting member is mounted on the stationary member, the sensor for detecting the load can be snugly and neatly installed in the automotive vehicle. Further, since the sensor signal processing circuit or the sensor signal processing circuit substrate is fitted to the sensor mounting member, the sensor signal processing circuit can be also installed compactly. Since the sensor mounting member is a handy component part that is fitted to the stationary member, by fitting the strain sensor and the sensor signal processing circuit to the sensor mounting member, it can be excellent in mass production and the cost can be reduced.

In the present invention, both of the strain sensor and the sensor signal processing circuit may be structured on the same surface, which is one of a plurality of surfaces forming surfaces of the sensor mounting member. In this way, the distance between the strain sensor and the sensor signal processing circuit can be reduced and, therefore, the wiring can be simplified.

In the present invention, where it is difficult to form both of the strain sensor and the sensor signal processing circuit on the same surface, which is one of a plurality of surfaces forming surfaces of the sensor mounting member, the strain sensor and the sensor signal processing circuit may be structured on different surfaces selected out of the plural surfaces forming the surfaces of the sensor mounting member. The plural surfaces forming the surfaces of the sensor mounting member referred to above mean surfaces having an angle or cant among those surfaces.

In the present invention, where the strain sensor and the sensor signal processing circuit are structured on the different surfaces, which are selected out of the plural surfaces forming the surfaces of the sensor mounting member, the strain sensor and the sensor signal processing circuit are electrically connected with each other by means of a wire or pin.

In the present invention, a signal transmitting path from the sensor signal processing circuit and an external device may be in the form of a cable. In such case, it is recommended to form a pad for connection with the cable in the sensor signal processing circuit.

When the signal transmitting path from the sensor signal processing circuit to the external device is in the form of the cable, wiring between the sensor signal processing circuit and the external device can be facilitated. Also, formation of the pad for connection with the cable in the sensor signal processing circuit is effective to facilitate connection of the cable with the sensor signal processing circuit.

In the present invention, the strain sensor referred to above is preferably formed of a thick film resistor.

Where the strain sensor is formed of the thick film resistor, the mounting strength with which the strain sensor is fitted to the sensor mounting member will not decrease with passage of time and, therefore, the reliability of the sensor unit can be increased.

In the present invention, an acting force estimation section may be provided, which calculates an external force acting on the wheel support bearing assembly or an acting force acting between a tire and a road surface based on an output from the strain sensor.

When the external force acting on the wheel support bearing assembly or the working force acting between the tire and the road surface, which is obtained by the acting force estimation section, is utilized in vehicle control of the automotive vehicle, a meticulous vehicle control can be achieved. Since the signal transmitting path from the sensor signal processing circuit to the external device is employed in the form of a cable and the use is made of a connector for physically bonding and electrically connecting between the sensor signal processing circuit and the cable, the labor incurred in making a wired connection between the sensor signal processing circuit and the external device can be simplified and the assemblability can also be increased.

In the present invention, the signal transmitting path from the sensor signal processing circuit or the sensor signal processing circuit substrate to the external device may be employed in the form of a cable, the use may be made of a connector for physically bonding and electrically connecting between the sensor signal processing circuit or the sensor signal processing circuit substrate and the cable, and a cover for protecting the connector may be fixed to the sensor mounting member. By so designing, the work to connect between the sensor signal processing circuit and the external device through wiring can be simplified and accordingly, the assemblability can be increased. Also, since the connector is protected by the cover, connection between the sensor signal processing circuit or the sensor signal processing circuit substrate and the cable will be less affected by external factors. The cover can be easily provided when fixed to the sensor mounting member.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE PREFERRED EMBODIMENTS

Figure 1:
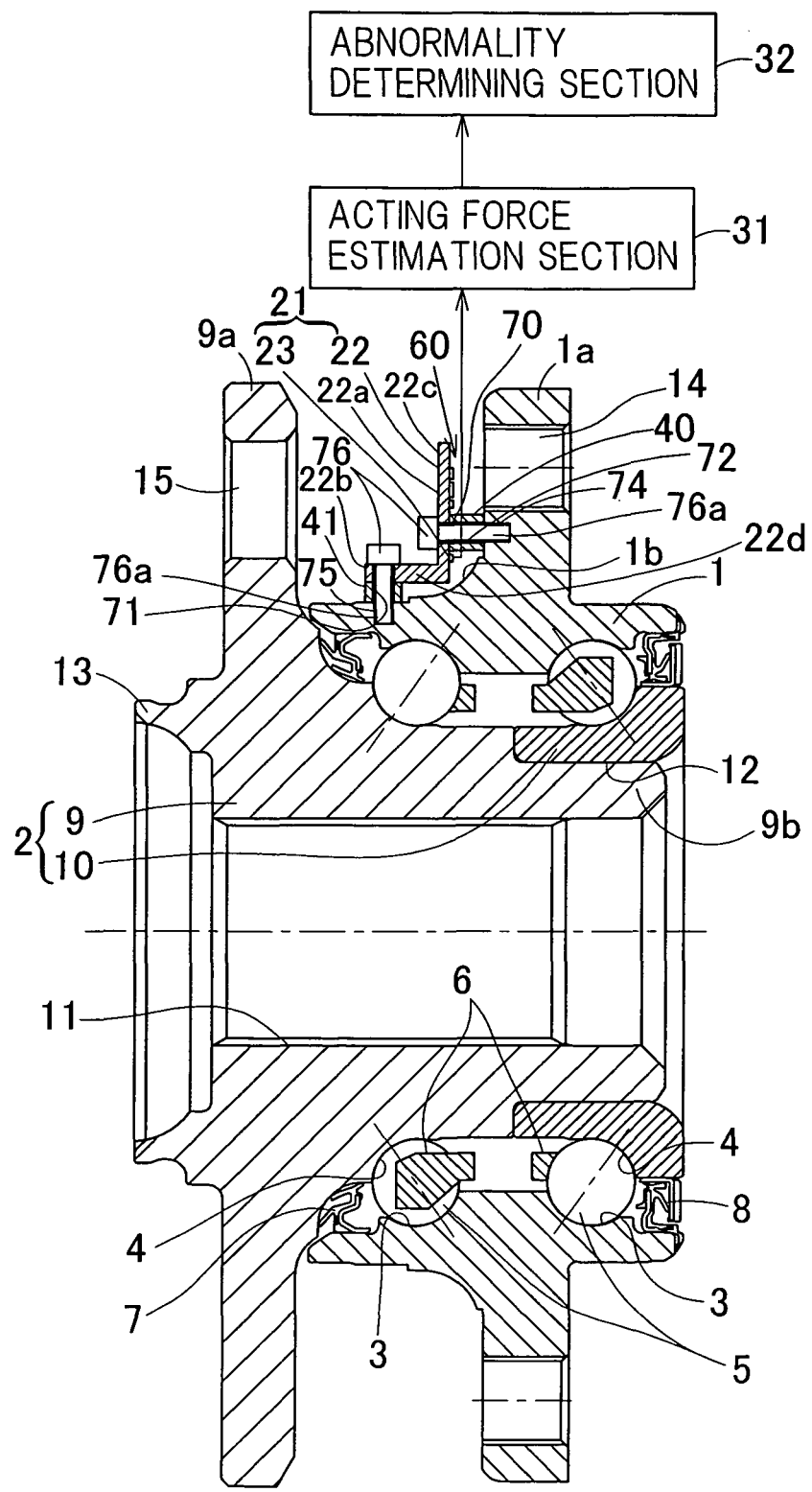
FIG. 1 is a diagram made up of a sectional view, showing a sensor equipped wheel support bearing assembly according to a first preferred embodiment of the present invention, and a block diagram showing a conceptual construction of a detecting system thereof.
Figure 2:
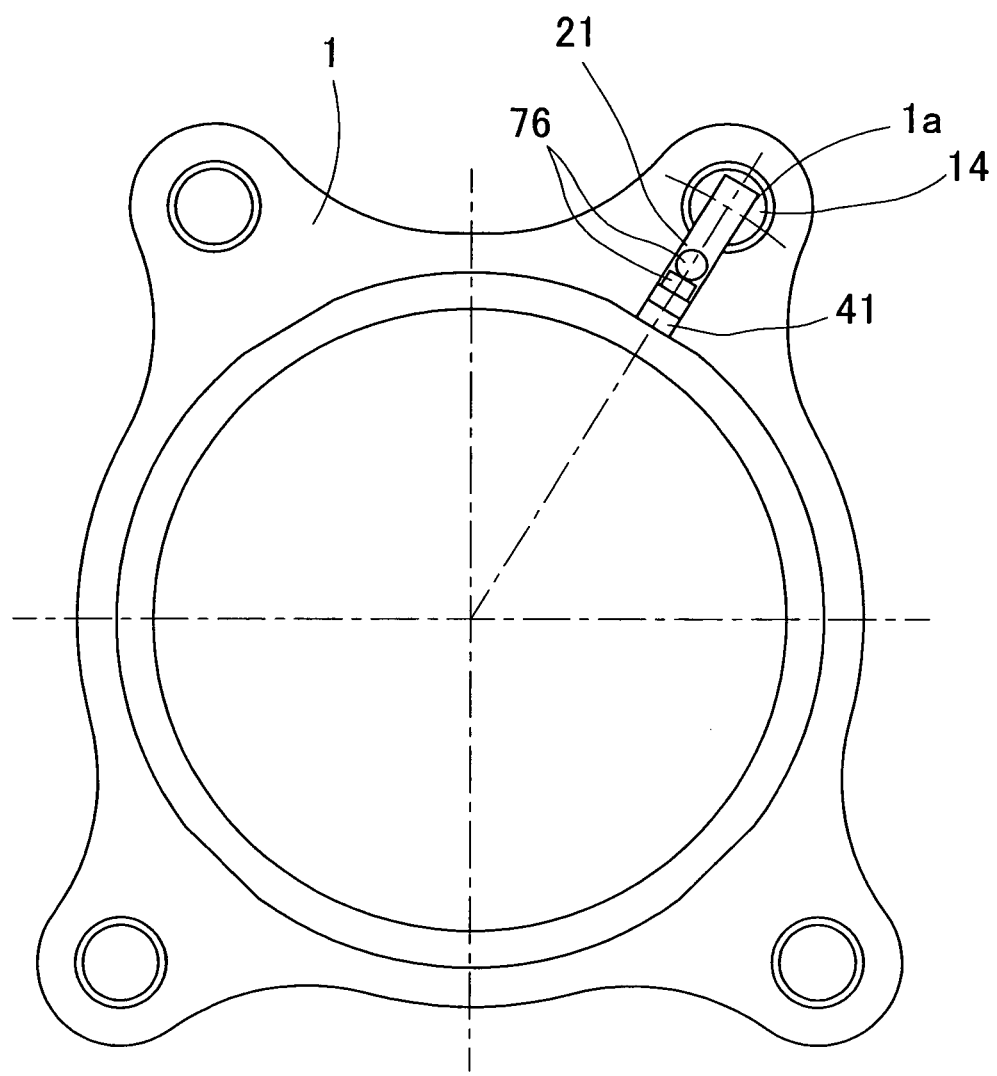
FIG. 2 is a front elevational view showing an outer member and a sensor unit, both forming respective parts of the sensor equipped wheel support bearing assembly.

A first preferred embodiment of the present invention will be described in detail with particular reference to FIGS. 1 to 4. This embodiment is directed to an inner race rotating model of a three generation type that is applied to a wheel support bearing assembly for the support of a vehicle drive wheel. It is to be noted that hereinafter in this specification, terms "outboard" and "inboard" represent one side of the vehicle body away from the longitudinal center of the vehicle body and the other side of the vehicle body close to the longitudinal center of the vehicle body, respectively when assembled in the vehicle body.

The sensor incorporated wheel support bearing assembly according to this embodiment includes an outer member 1 having its inner periphery formed with a double row rolling surfaces 3, an inner member 2 formed with rolling surfaces 4 confronting or in face-to-face relation with the respective rolling surfaces 3, and double row rolling elements 5 interposed between the rolling surfaces 3 of the outer member 1 and the rolling surfaces 4 of the inner member 2. This wheel support bearing assembly is rendered to be a double row angular contact ball bearing type, in which the rolling elements 5 are employed in the form of balls that are rollingly retained by retainers 6 employed for each row. The rolling surfaces 3 and 4 have arcuately sectioned shapes and the rolling surfaces 3 and 4 are so formed as to have a contact angle oriented outwardly. Opposite annular open ends of a bearing space delimited between the outer member 1 and the inner member 2 are sealed by respective sealing devices 7 and 8.

The outer member 1 is the one that serves as a stationary member and is of one-piece construction having its outer periphery formed with a flange 1a for securement to an automobile suspension system (not shown) mounted on the automotive vehicle. The flange 1a has a plurality of vehicle mounting holes 14 defined at a corresponding number of circumferential locations thereof.

The inner member 2 is the one that serves as a rotatable member and includes a hub unit 9 having a hub flange 9a for the support of a vehicle wheel and an inner ring 10 mounted on an inboard end of a hub axle 9b of the hub unit 9. The double row rolling surfaces 4 referred to previously are formed respectively in the hub unit 9 and the inner ring 10. The inboard end of the hub unit 9 has its outer periphery radially inwardly stepped to define an inner ring mounting area 12 of a reduced diameter, with the inner ring 10 fixedly mounted thereon. The hub unit 9 has a center bore 11 defined therein so as to extend axially completely through the length of the hub unit 9. The hub flange 9a has a plurality of press-fitting holes 15 defined in respective circumferential locations thereof for receiving corresponding hub bolts (not shown) press-fitted therein. The hub flange 9a of the hub unit 9 has a root portion thereof, adjacent the hub axle 9b, formed with a cylindrical pilot portion 13 so as to protrude in an outboard direction, which pilot portion 13 serves to guide the vehicle wheel and a brake component (not shown).

Figure 3A:
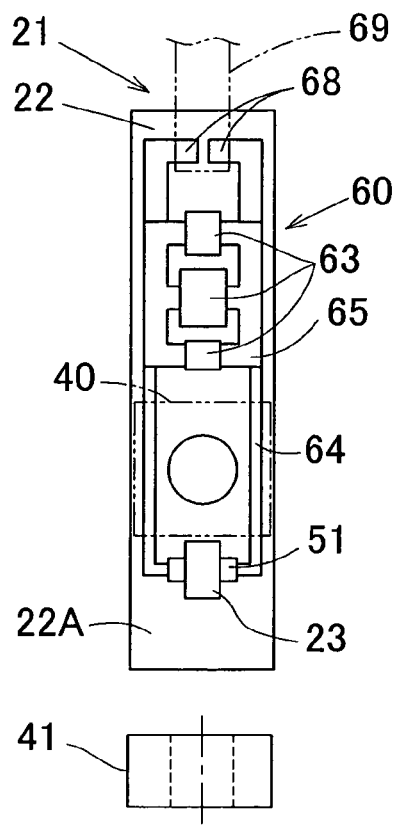
FIG. 3A is a rear elevational view showing the sensor unit and first and second fitting members separated from each other.
Figure 3B:
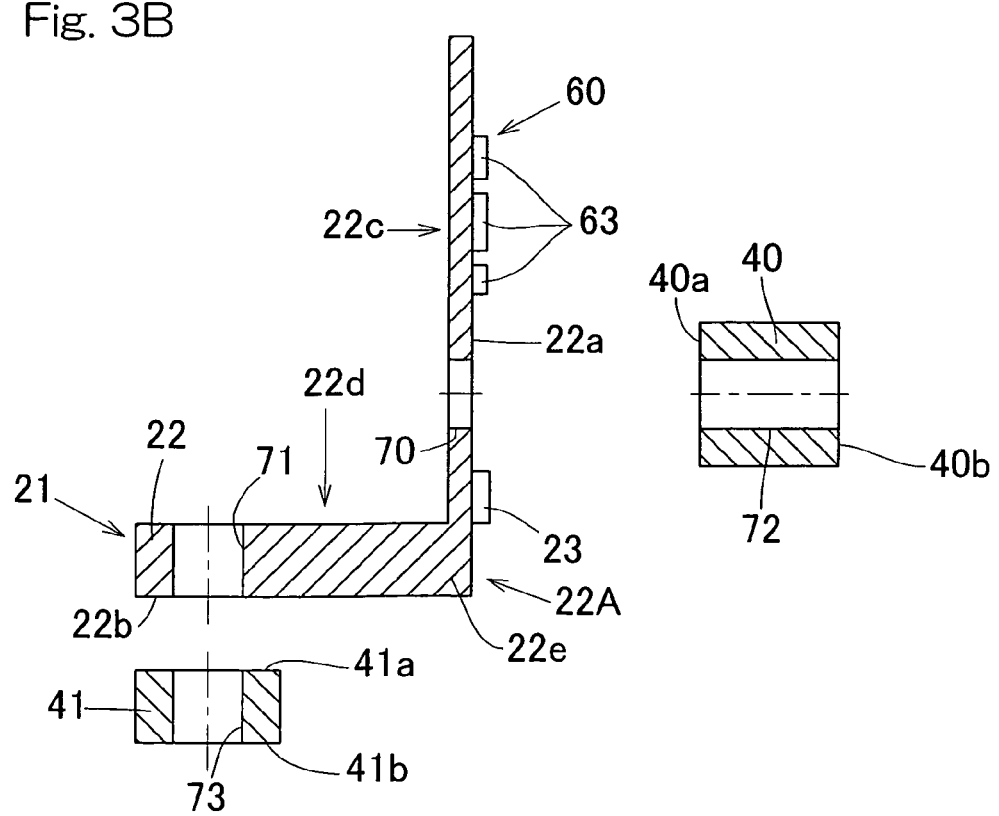
FIG. 3B is a side sectional view of FIG. 3A.

A sensor unit 21 shown in FIGS. 3A and 3B is mounted on an outer peripheral portion of the outer member 1. This sensor unit 21 includes a sensor mounting member 22, a strain sensor 23 for measuring a strain induced in such sensor mounting member 22 and a sensor signal processing circuit 60 for processing an output signal from the strain sensor 23. The sensor unit 21 is fitted to the outer member 1 through first and second fitting members 40 and 41.

As shown in FIG. 3B, the sensor mounting member 22 includes a first contact fixing portion 22a adapted to be fixed to the first fixing member 40 in contact therewith and a second contact fixing portion 22b adapted to be fixed to the second fixing member 41 in contact therewith. This sensor mounting member 22 is of a L-shaped configuration having a radially extending portion 22c extending in a radial direction and an axially extending portion 22d extending in an axial direction, and an intermediate area of the radially extending portion 22c is rendered to be the first contact fixing portion 22a whereas a free end area of the axially extending portion 22d is rendered to be the second contact fixing portion 22b. The radially extending portion 22c has a wall thickness reduced to have a lowered rigidity as compared with that of the axially extending portion 22d. The strain sensor 23 is arranged in a sensor mounting surface 22A, which is an inboard side surface of the radially extending portion 22c, at a location radially inwardly of the first contact fixing portion 22a. Also, the sensor signal processing circuit 60 is arranged in the sensor mounting surface 22A at a location radially outwardly of the first contact fixing portion 22a.

Figure 4:
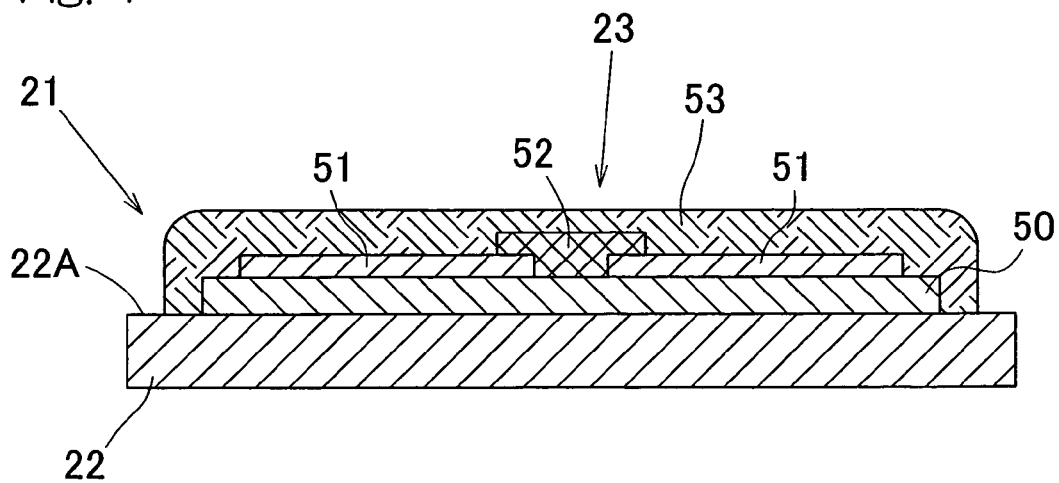
FIG. 4 is a diagram showing a sectional structure of the sensor unit.

As best shown in FIG. 4, the strain sensor 23 is formed on the sensor mounting surface 22A of the sensor mounting member 22 in the form of a thick film resistor. In other words, it is of such a structure that an insulating layer 50 is formed on the sensor mounting surface 22A; electrodes 51 and 51 forming a pair are formed on opposite surface portions of the insulating layer 50; a strain measuring resistor 52 in the form of the thick film resistor, which defines the strain sensor, is formed on the insulating layer 50 so as to bridge between those electrodes 51 and 51; and a protective film 53 is formed over the electrodes 51 and 51 and the strain measuring resistor 52.

As best shown in FIG. 3A, the sensor signal processing circuit 60 has electric and electronic components 63 including an operational amplifier, a resistor and a microcomputer for processing an output signal of the strain sensor 23, and a semiconductor chip on which circuit elements such as an electric power supply for driving the strain sensor 23 are integrated. On a surface of the insulating layer 50 are formed electrodes 64 for electrically connecting between the strain sensor 23 with the electric and electronic components 63, electrodes 65 defining wiring for various component parts of the electric and electronic components 63 and a pad 68 for connection with a cable 69 defining a signal transmitting path from the sensor signal processing circuit 60 to an external device such as an electric control unit (ECU) or the like of an automotive vehicle.

A method of making the sensor unit 21 is shown as follows. At the outset, as shown in FIG. 4, an insulating material such as glass is printed and baked on a surface of the sensor mounting member 22, made of a metallic material such as stainless steel or the like, to thereby form the insulating layer 50. Then, an electroconductive material is printed and based on a surface of the insulating layer 50 to form the electrodes 51, the electrodes 64 and 65 shown in FIG. 3A and the pad 68. In addition, a material which eventually forms a resistor is printed and based between the pair of the electrodes 51 and 51 to thereby form the strain measuring resistor 52. Yet, for protecting the electrodes 51 and 51 and the strain measuring resistor 52, the protective film 53 is formed as mentioned above. Finally, the electric and electronic components 63 are surface mounted.

The structure for fitting the sensor unit 21 to the outer member 1 will now be described. As best shown in FIG. 3B, an axially extending bolt insertion hole 70 is formed in the first contact fixing portion 22a of the sensor mounting member 22 and a radially extending bolt insertion hole 71 is formed in the second contact fixing portion 22b. Also, the first fixing member 40 is formed with a bolt insertion hole 72 cooperable with the bolt insertion hole 70 and the second fixing member 41 is formed with a bolt insertion hole 73 cooperable with the bolt insertion hole 71. In addition, as best shown in FIG. 1, bolt threading holes 74 and 75 each having a peripheral surface formed with female threads are formed in the outer member 1 at a position alignable with the bolt insertion holes 70 and 72 and at a position alignable with the bolt insertion holes 71 and 73, respectively. The position of the bolt threading hole 74 is chosen to be in the vicinity of the vehicle body fitting hole 14 and the position of the bolt threading hole 75 is chosen to be in an outer peripheral surface of the outer member 1. Those bolt threading holes 74 and 75 are positioned on the same phase with respect to a circumferential direction of the outer member 1.

Referring to FIG. 1, the sensor unit 21 is fixed to the outer member 1 by inserting a bolt 76 from an outboard side into the bolt insertion hole 70 in the sensor mounting member 22 and the bolt insertion hole 72 in the first fixing member 40 and threading a male thread portion 76a of such bolt 76 into the bolt threading hole 74 in the outer member 1 and, on the other hand, by inserting a bolt 76 from an outer peripheral side into the bolt insertion hole 71 in the sensor mounting member 22 and the bolt insertion hole 73 in the second fixing member 41 and threading a male thread portion 76a of the bolt 76 into the bolt threading hole 75 in the outer member 1.

In the condition in which the sensor unit 21 is fixed in the manner described above, as shown in FIGS. 1 and 2, the first contact fixing portion 22a of the sensor mounting member 22 is fixed in the vicinity of the vehicle body fitting hole 14 in the outer member 1 in contact therewith through the first fixing member 40, whereas the second contact fixing portion 22b is fixed to the outer peripheral surface of the outer member 1 in contact therewith through the second fixing member 41. Also, the first and second contact fixing portions 22a and 22b are so fixed as to be held at respective positions on the same phase with respect to the circumferential direction of the outer member 1. When the first and second contact fixing portions 22a and 22b are held on the same phase with respect to the circumferential direction, the sensor mounting member 22 can have a reduced length and, accordingly, the sensor unit 21 can be easily installed.

As shown in FIG. 1, as a means for processing the output of the strain sensor 23, a acting force estimation section 31 and an abnormality determining section 32 are provided. Those sections 31 and 32 may be provided either in the sensor signal processing circuit 60 of the wheel support bearing assembly or in the electric control unit (ECU) of the automotive vehicle.

The operation of the wheel support bearing assembly of the structure hereinabove described will now be described. When a load is applied to the hub unit 9 shown in FIG. 1, the outer member 1 is deformed through the rolling elements 5. Deformation of the outer member 1 is in turn transmitted to the sensor mounting member 22 through the first and second fixing members 40 and 41, resulting in deformation of the sensor mounting member 22. Strain occurring in the sensor mounting member 22 is measured by the strain sensor 23. At this time, the radially extending portion 22c of the sensor mounting member 22 deforms in response to deformation of the flange 1a integral or rigid with the outer member 1. In the case of this embodiment now under discussion, since as compared with the outer member 1, the radially extending portion 22c has a low rigidity and the sensor mounting member 22 is so structured as to represent the L-shaped configuration including the radially extending portion 22c of a low rigidity and the axially extending portion 22d of a high rigidity, the strain concentrated in the vicinity of a corner area 22e (FIG. 3B), which lies intermediate between the radially extending portion 22c and the axially extending portion 22d and which is rather adjacent to the radially extending portion 22c, resulting in that a strain higher than that in the outer member 1 appears. In other words, the strain developing intermediate between the radially extending portion 22c and the axially extending portion 22d can be considered corresponding to the strain occurring in an R portion 1b at the root of the flange 1a, which has been transcribed and expanded. Since this strain is measured by the strain sensor 23, the strain occurring in the outer member 1 can be detected with high sensitivity and, hence, the strain measuring precision can be increased.

Since the manner of change of the strain varies depending on the direction and the magnitude of the load, by determining the relation between the strain and the load beforehand by means of a series of experiments and/or simulations, the external force acting on the wheel support bearing assembly or the working force between the vehicle tire and the road surface can be calculated. The acting force estimation section 31 referred to previously is operable to calculate the external force acting on the wheel support bearing assembly or the working force between the vehicle tire and the road surface in reference to an output from the strain sensor 23 by the utilization of the relation between the strain and the load which has been determined by means of the experiments and/or simulations. The abnormality determining section 32 referred to previously is operable to output an abnormality signal to the outside when the section 32 determines that the external force acting on the wheel support bearing assembly or the working force between the vehicle tire and the road surface, which has been calculated by the acting force estimation section 31, exceeds a tolerance. This abnormality signal can be used in a vehicle control of the automotive vehicle. Also, when the external force acting on the wheel support bearing assembly or the working force between the vehicle tire and the road surface is detected in real time, a meticulous vehicle control can be carried out.

As shown in FIG. 1, the sensor unit 21 of the construction described above, including the sensor mounting member 22 and the strain sensor 23 fitted to this sensor mounting member 22, is fitted to the outer member 1 and, therefore, the sensor for the detection of the load can be compactly installed on the automotive vehicle. Also, the provision of the sensor signal processing circuit 60 in the sensor mounting member 22 makes it possible to install the sensor signal processing circuit 60 compactly. As best shown in FIG. 3A, since the strain sensor 23 and the sensor signal processing circuit 60 are electrically connected with each other through the electrodes 64 during the manufacture of the sensor unit 21, no wiring is needed to connect the strain sensor 23 with the sensor signal processing circuit 60 during installation of the sensor unit 21 onto the wheel support bearing assembly. In addition, since the signal transmitting path from the sensor signal processing circuit 60 to the external device such as the electric control unit (ECU) of the automotive vehicle is employed in the form of the cable 69 and the pad 68 for connection with this cable 69 is formed in the sensor signal processing circuit 60, the wiring between the sensor signal processing circuit 60 and the external device can be simplified.

Also, since the sensor unit 21 is fitted to the outer member 1 through the first and second fixing members 40 and 41, not directly to the outer member 1, the sensor mounting member 22 can have a simplified L-shaped configuration. When the sensor mounting member 22 is of such a simplified shape, the sensor mounting member 22 can easily be processed and the production cost thereof can be reduced. Also, when the sensor mounting member 22 is of such a simplified shape, respective position at which the strain sensor 23 and the sensor signal processing circuit 60 are fixed can be precisely set. In the case of this first embodiment, since the sensor mounting surface 22A of the sensor mounting member 22, on which the strain sensor 23 is provided, is flat, it is easy to form the strain sensor 23 on the surface of the sensor mounting member 22 in the form of a thick film resistor.

Where the strain sensor 23 is structured by a metallic foil strain gauge, the strain sensor 23 is generally fixed in position by bonding to the sensor mounting member 22. However, the fixing by bonding involves the possibility that reduction in bonding strength resulting from aging will adversely affect the detection by the strain sensor 23. Also, since a substantial length of time is required in a bonding work, it will constitute a cause of increase of the production cost. In contrast thereto, when the sensor unit 21 is formed with the strain sensor 23 formed on the sensor mounting surface 22A of the sensor mounting member 22 in the form of a thick film resistor such as in the embodiment now under discussion, no substantial reduction in bonding strength resulting from aging will occur and, therefore, the reliability of the sensor unit 21 can be increased. Moreover, since no bonding work is required for the strain sensor 23, the assemblability can be increased to thereby reduce the production cost.

Figure 5:
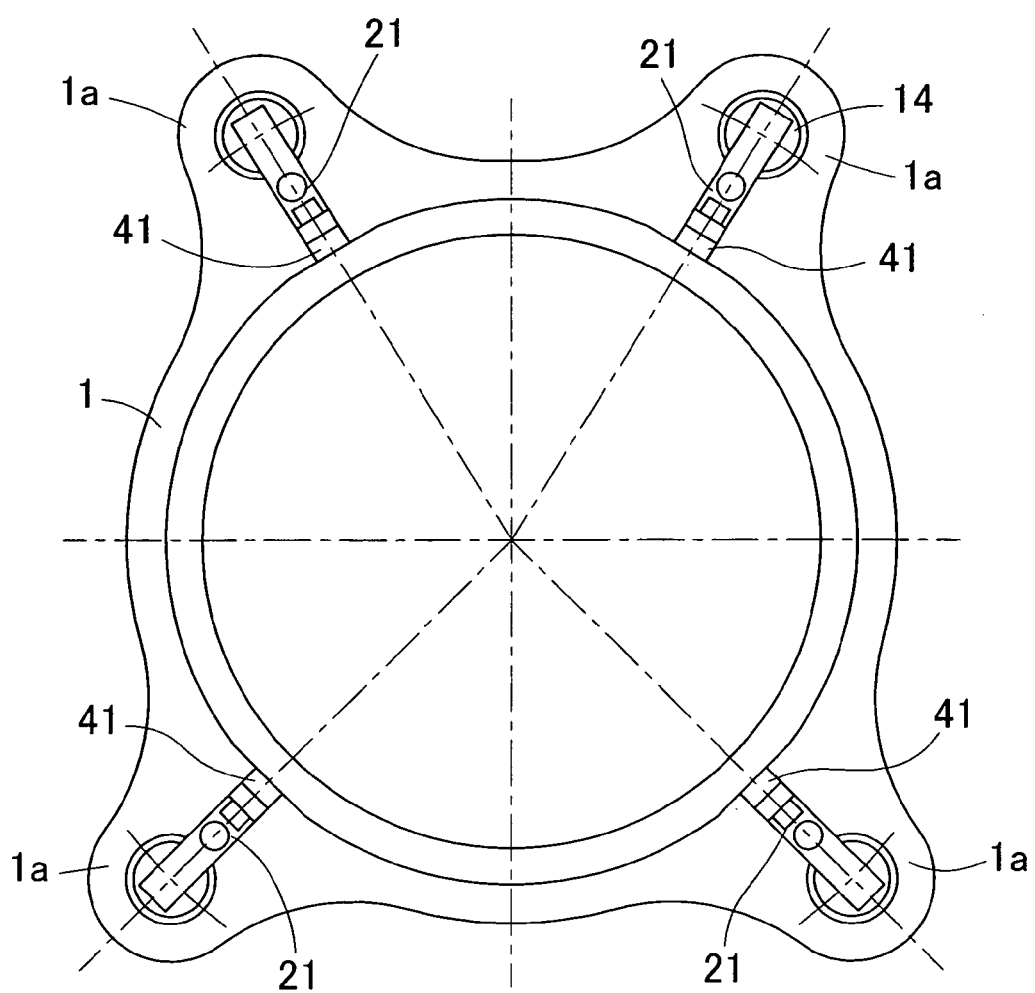
FIG. 5 is a front elevational view showing the outer member and the sensor unit, both forming respective parts of the sensor equipped wheel support bearing assembly according to a second preferred embodiment of the present invention.
Figure 6:
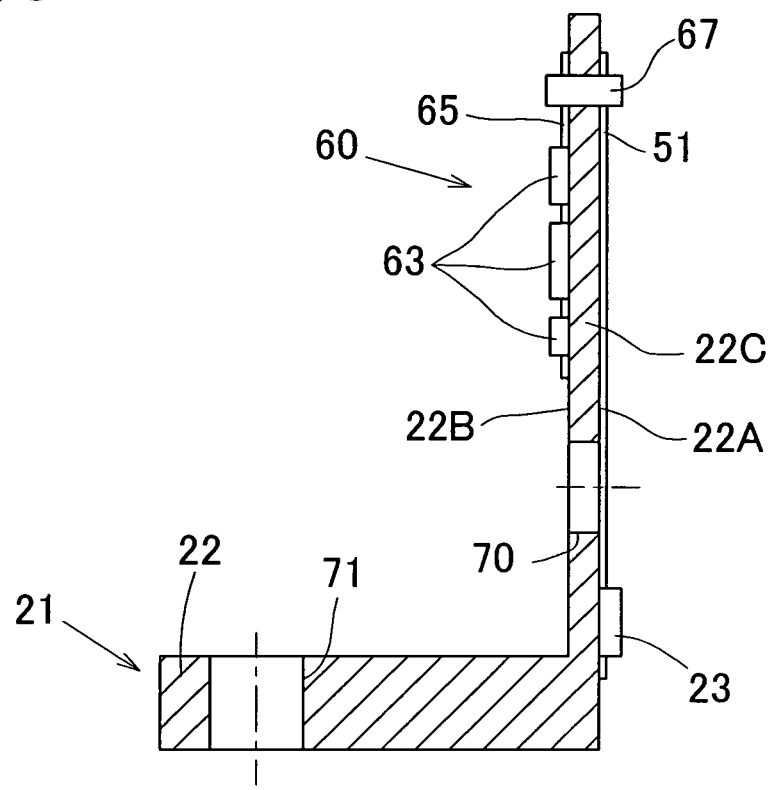
FIG. 6 is a side sectional view showing the sensor unit employed in the sensor equipped wheel support bearing assembly according to a third preferred embodiment of the present invention.
Figure 7:
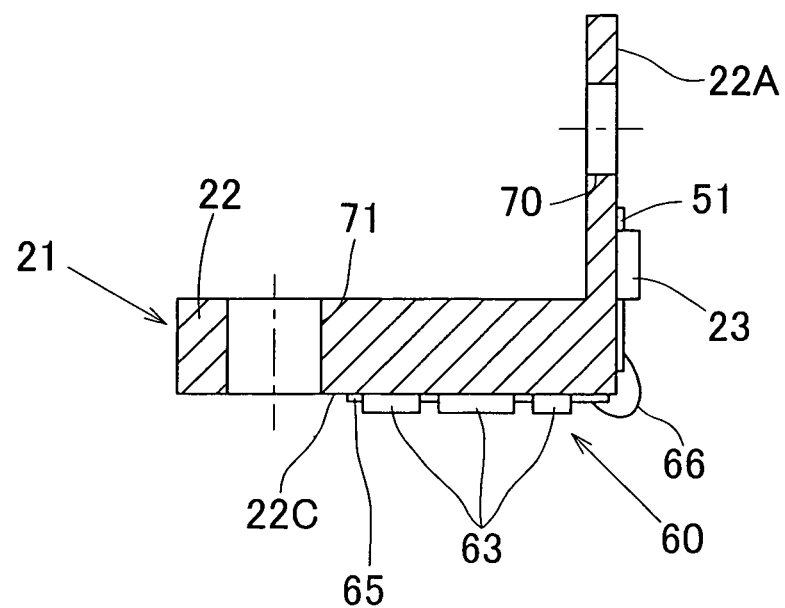
FIG. 7 is a side sectional view showing the sensor unit employed in the sensor equipped wheel support bearing assembly according to a fourth preferred embodiment of the present invention.

Although the first embodiment described hereinabove is such that the sensor unit 21 is provided at only one location of the outer member 1, the sensor unit 21 may be positioned at, for example, two or more locations such as in a second preferred embodiment of the present invention shown in FIG. 5. In such case, the sensor signal processing circuit 60 is provided for each of the sensor units 21, or the sensor signal processing circuit 60 is provided in at least one of the sensor units 21 and is electrically connected by wiring with the strain sensors 23 of the other sensor units 21 for which no sensor signal processing circuit 60 is provided. When the sensor unit 21 is provided at two or more locations, a further highly precise load detection can be achieved.

Where it is difficult to form the sensor signal processing circuit 60 on the sensor mounting surface 22A, the sensor signal processing circuit 60 may be formed on a surface different from the sensor mounting surface 22A such as in a third preferred embodiment shown in FIG. 6 or in a fourth preferred embodiment shown in FIG. 7.

The sensor unit 21 shown in FIG. 6 is of a type in which the sensor signal processing circuit 60 is provided on a surface 22B of the sensor mounting member radially extending portion 22c opposite to the sensor mounting surface 22A thereof. The electrode 51 in the sensor mounting surface 22A and the electrode 65 in the opposite surface 22B are electrically connected with each other through a pin 67 inserted so as to extend through the radially extending portion 22c.

On the other hand, the sensor unit 21 shown in FIG. 7 is such that the sensor signal processing circuit 60 is arranged on an inner surface 22C of the sensor mounting member axially extending portion 22d. The electrode 51 in the sensor mounting surface 22A and the electrode 65 in the axially extending portion inner surface 22C are electrically connected with each other by means of a wiring.

In other words, the strain sensor 23 and the sensor signal processing circuit 60 may be arranged either on the same plane of the surface of the sensor mounting member 22 or on different surfaces selected out of a plurality of surfaces forming the surfaces of the sensor mounting member 22. The plurality of surfaces forming the surfaces of the sensor mounting member 22 referred to above mean surfaces having an angle or cant among those surfaces.

Hereinafter, the sensor equipped wheel support bearing assembly according to a fifth preferred embodiment of the present invention will be described in detail with particular reference to FIGS. 8A and 8B corresponding respectively to FIGS. 3A and 3B. The basic construction of this wheel support bearing assembly is substantially similar to that according to the previously described first embodiment shown in FIG. 1, but differs therefrom in that in this fifth embodiment, the sensor signal processing circuit is formed on a sensor signal processing circuit substrate 61 shown in FIG. 8B, which is in turn fitted to the sensor mounting member 22. The sensor unit 21 shown therein is also fitted, in a manner similar to that in the previously described first embodiment, to an outer peripheral portion of the outer member 1 shown in FIG. 1 through the first and second fixing members 40 and 41, and the strain sensor 23 for measuring the strain occurring in the sensor mounting member 22 and the sensor signal processing circuit substrate 61, on which the sensor signal processing circuit for processing an output from the strain sensor 23 is formed, are fitted to the sensor mounting member 22 of the sensor unit 21.

Figure 8A:
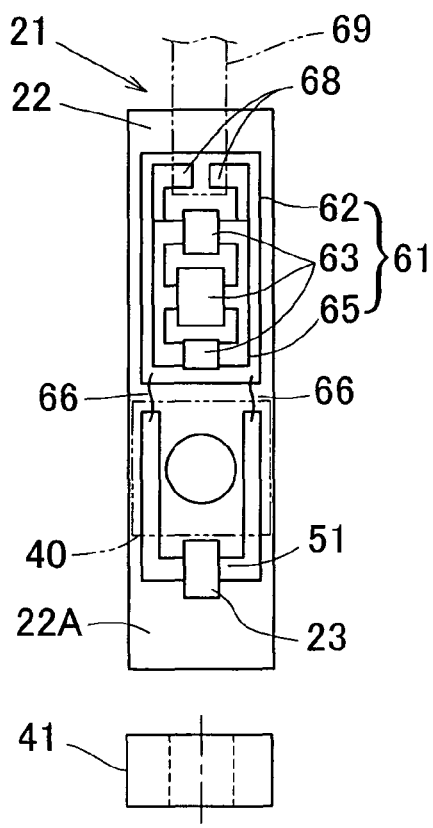
FIG. 8A is a rear elevational view showing the sensor unit employed in the sensor equipped wheel support bearing assembly according to a fifth preferred embodiment of the present invention and the first and second fitting members separated from each other.

As best shown in FIG. 8A, the sensor signal processing circuit substrate 61 is of a structure in which electric and electronic components 63 such as an operational amplifier, a resistor or a microcomputer for processing an output signal from the strain sensor 23 and a semiconductor chip, on which circuit elements such as an electric power supply for driving the strain sensor 23 are integrated, are arranged on a substrate material 62 fabricated with glass epoxy, with those components connected by means of electrodes 65 forming wirings. The electrode 51 of the strain sensor 23 and the electrode 65 of the sensor signal processing circuit substrate 61 are electrically connected with each other by means of a wire 66. Also, the signal transmitting path from the sensor signal processing circuit substrate 61 to the external device such as the electric control unit (ECU) of the automotive vehicle is represented by a cable 69, and a pad 68 for connection with the cable 69 is formed in the sensor signal processing circuit substrate 61.

Figure 8B:
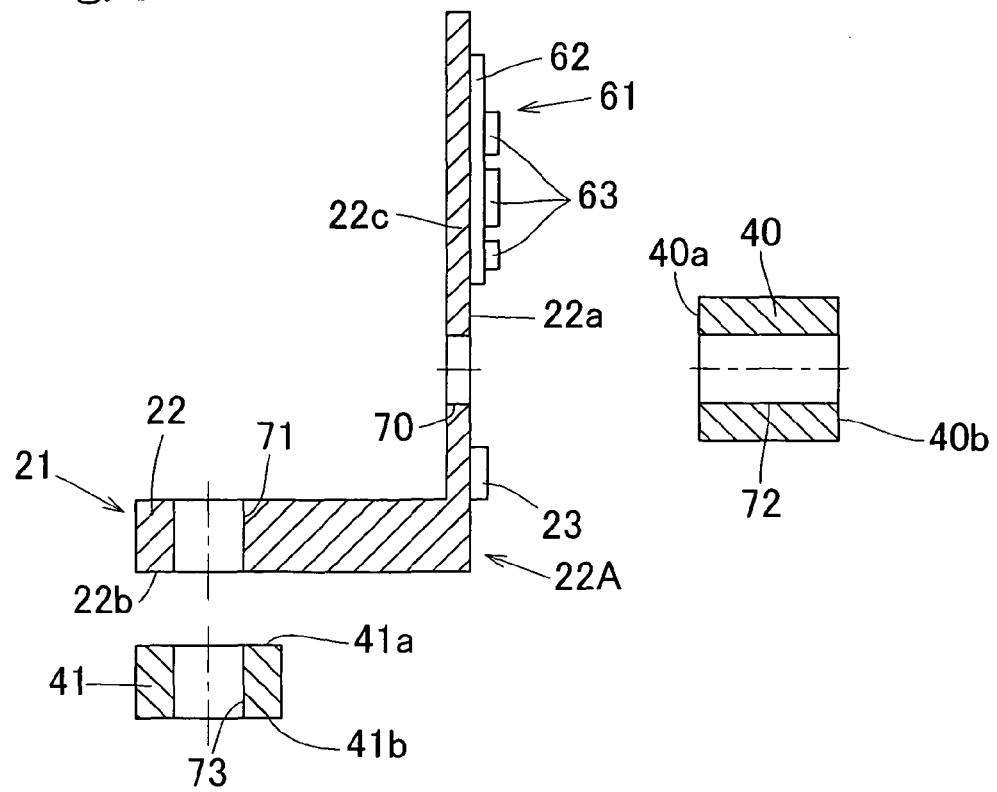
FIG. 8B is a side sectional view of FIG. 8A.

In this fifth embodiment, as shown in FIG. 8B corresponding to FIG. 3B, the strain sensor 23 and the sensor signal processing circuit substrate 61 are formed on one of the plural surfaces forming the surfaces of the sensor mounting member 22. In such case, the sensor signal processing circuit substrate 61 is fitted to the sensor mounting surface 22A. When the strain sensor 23 and the sensor signal processing circuit substrate 61 are structured on one of the plural surfaces forming the surfaces of the sensor mounting member 22, the distance therebetween can be reduced and, therefore, the wiring can be simplified as is the case with the first embodiment described hereinbefore.

Figure 9:
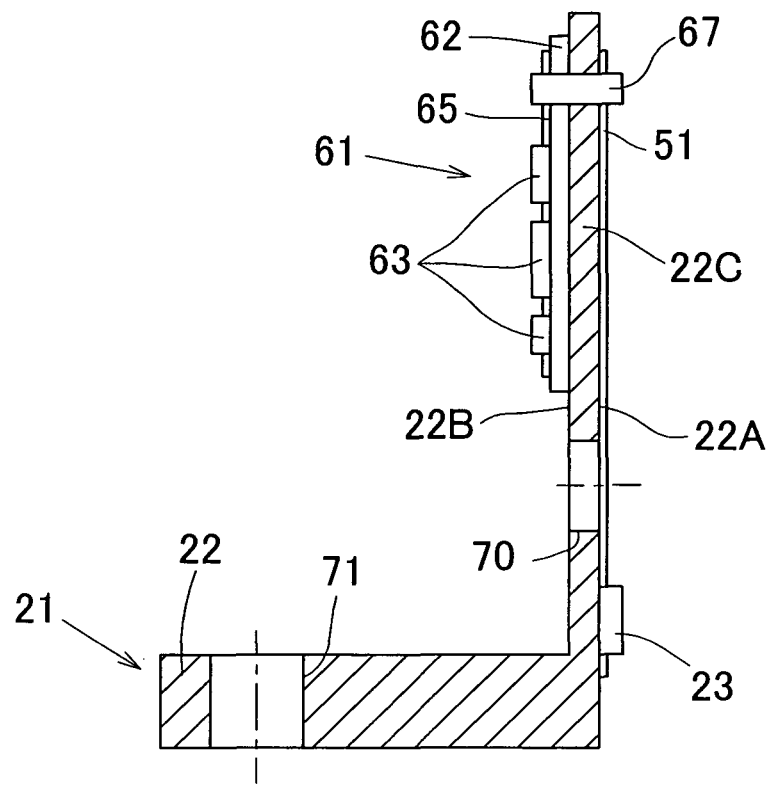
FIG. 9 is a side sectional view showing the sensor unit employed in the sensor equipped wheel support bearing assembly according to a sixth preferred embodiment of the present invention.
Figure 10:
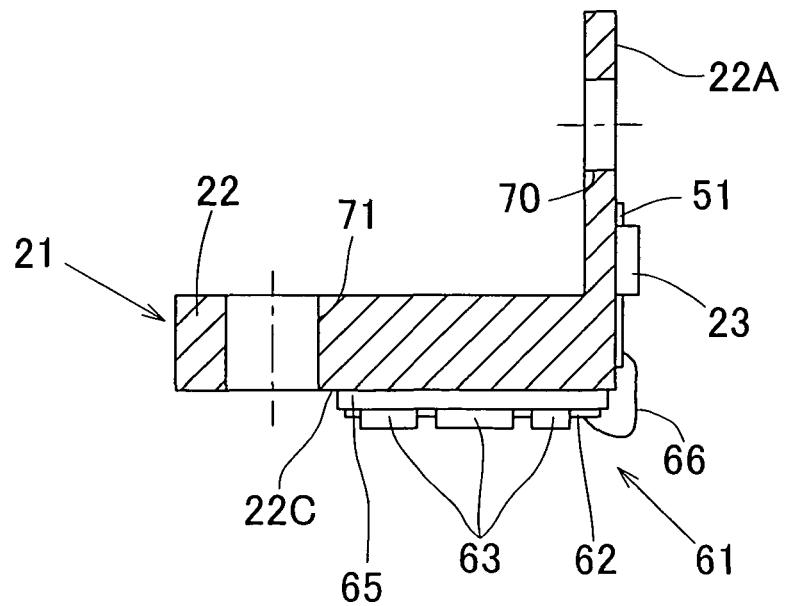
FIG. 10 is a side sectional view showing the sensor unit employed in the sensor equipped wheel support bearing assembly according to a seventh preferred embodiment of the present invention.

FIG. 9 corresponding to FIG. 6 illustrates the sensor unit employed in the sensor equipped wheel support bearing assembly according to a sixth preferred embodiment of the present invention. The sensor unit 21 shown therein is such that in a manner similar to that according to the previously described third embodiment shown in FIG. 6, the strain sensor 23 is fitted to the sensor mounting surface 22A of the sensor mounting member radially extending portion 22c and the sensor signal processing circuit substrate 61 is fitted to the surface 22B opposite to the sensor mounting surface 22A. The electrode 51 of the sensor mounting surface 22A and the electrode 65 of the opposite surface 22B are electrically connected with each other through a pin 67 inserted so as to extend through the radially extending portion 22c. By so constructing, even in the case where it is difficult to form the strain sensor 23 and the sensor signal processing circuit substrate 61 on one of the plural surfaces forming the surfaces of the sensor mounting member 22, the strain sensor 23 and the sensor signal processing circuit substrate 61 can be so formed. Also, FIG. 10 corresponding to FIG. 7 illustrates the sensor unit employed in the sensor equipped wheel support bearing assembly according to a seventh preferred embodiment of the present invention. The sensor unit 21 shown therein is such that the sensor signal processing circuit substrate 61 is fitted to the inner surface 22C of the sensor mounting member axially extending portion 22d. The electrode 51 of the sensor mounting surface 22A and the electrode 65 of the axially extending portion inner surface 22C are electrically connected with each other by means of a wire 66. In other words, the strain sensor 23 and the sensor signal processing circuit substrate 61 may be fitted to surfaces different from each other, selected out of the plural surfaces forming the surfaces of the sensor mounting member 22. By so designing, the sensor signal processing circuit substrate 61 can be installed at various positions and a diversity of installation can be planned therefor.

In the next place, an eighth preferred embodiment of the present invention will be described in detail with particular reference to FIGS. 11 to 13B. Even the wheel support bearing assembly according to this eighth embodiment has a basic construction substantially similar to that according to the first embodiment shown in and described with reference to FIGS. 1 to 4 and, therefore, like parts are designated by like reference numerals while only the difference between the eighth and first embodiments are described below.

Figure 11:
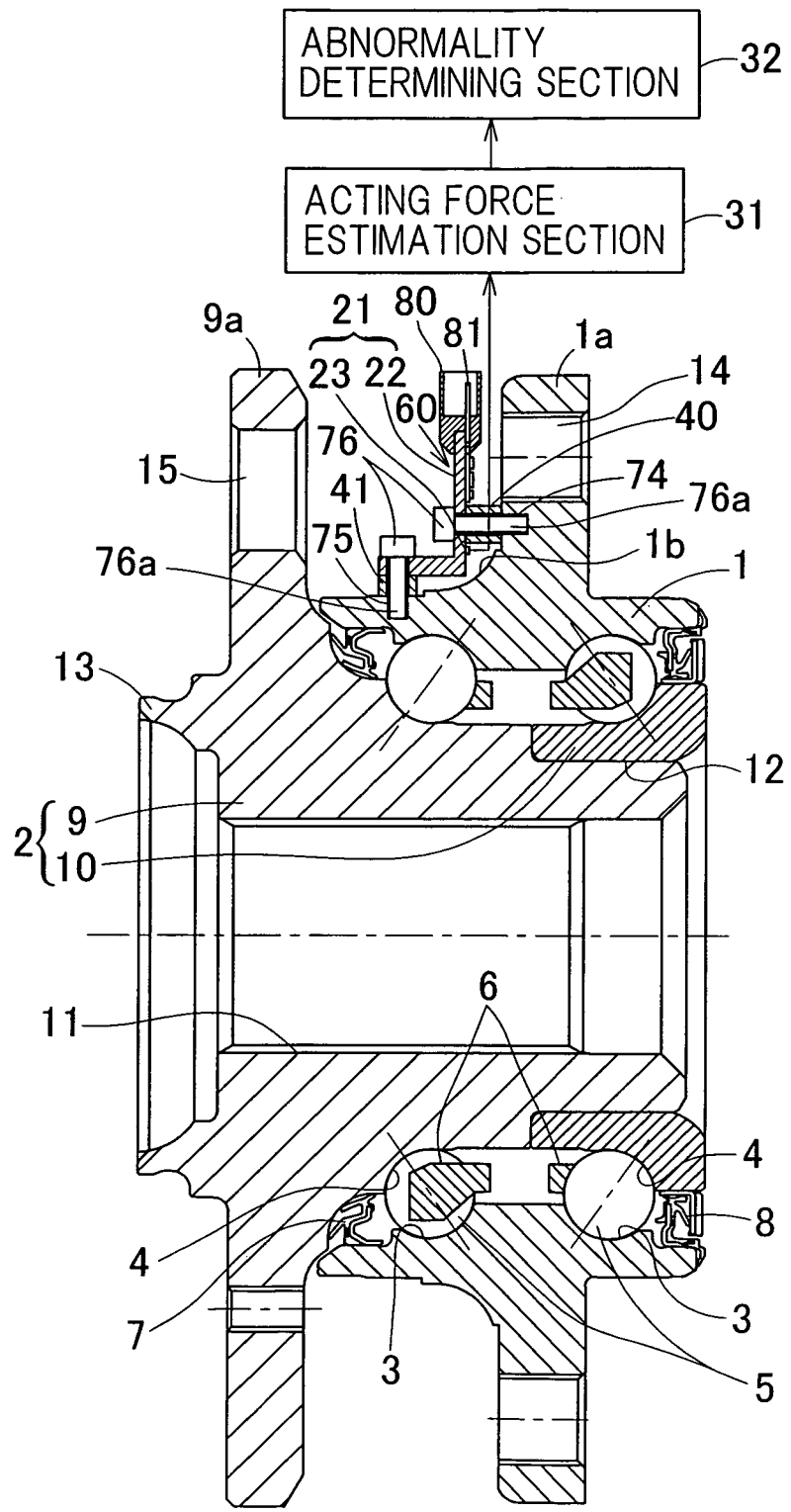
FIG. 11 is a diagram made up of a sectional view, showing the sensor equipped wheel support bearing assembly according to an eighth preferred embodiment of the present invention, and a block diagram showing a conceptual construction of the detecting system therefor.
Figure 12:
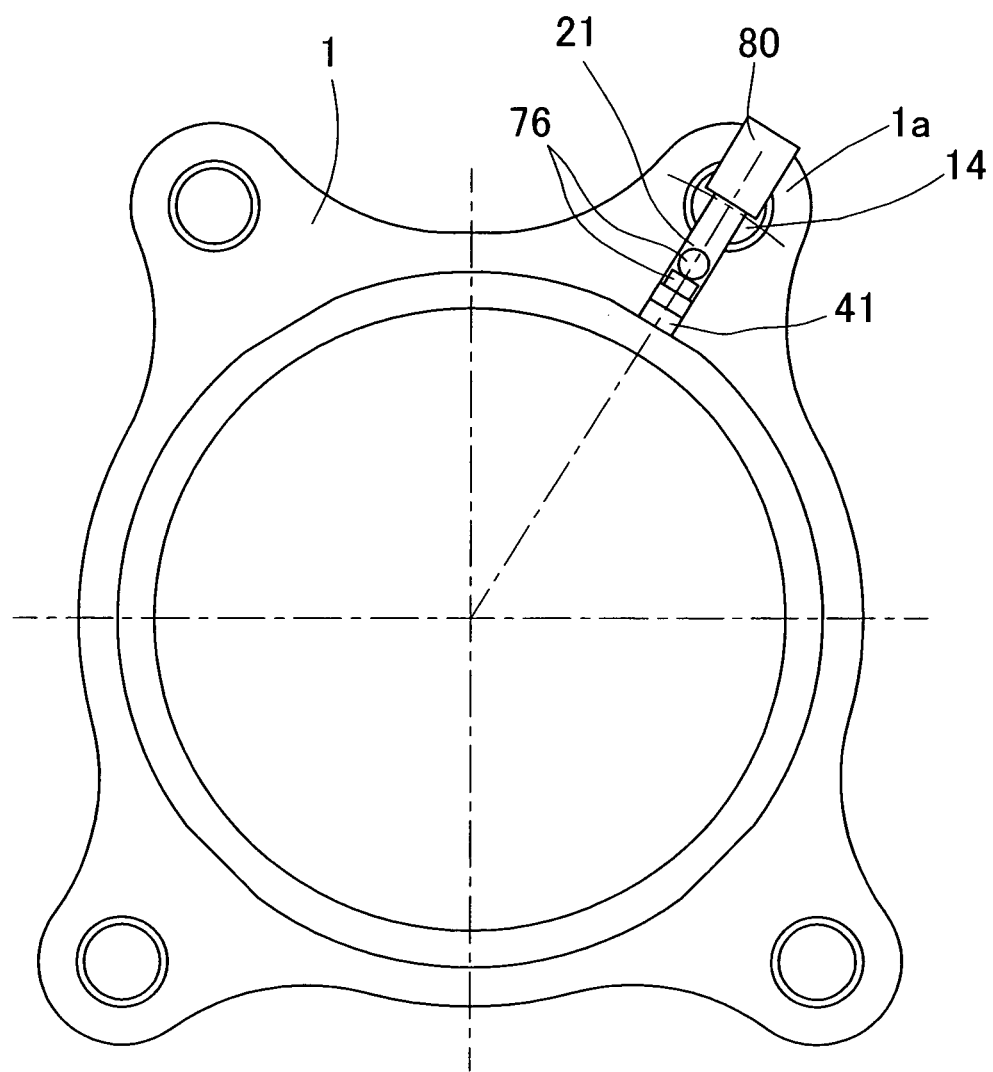
FIG. 12 is a front elevational view showing the outer member and the sensor unit both forming the respective parts of the sensor equipped wheel support bearing assembly.
Figure 13A:
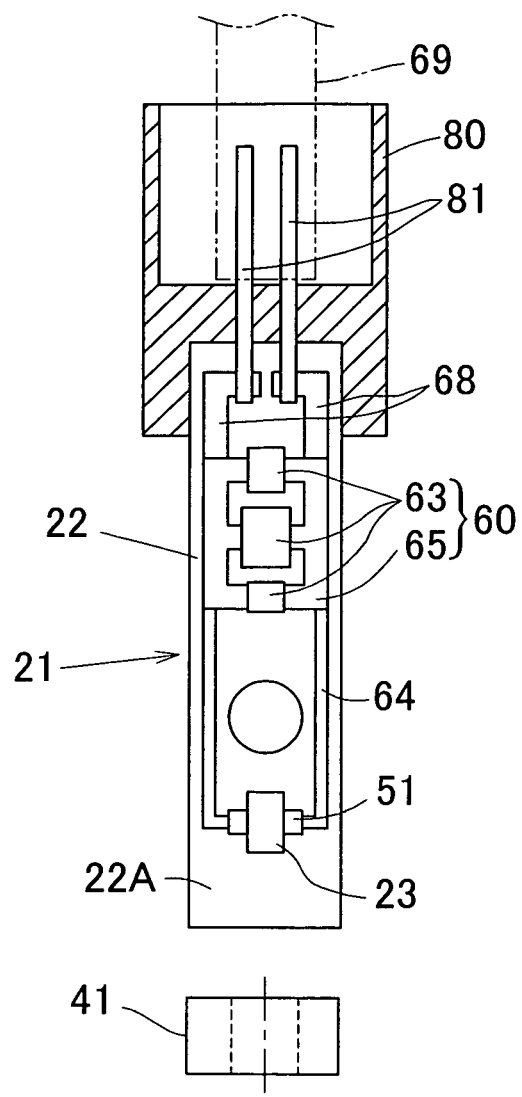
FIG. 13A is a rear sectional view showing the sensor unit and the first and second fitting members separated from each other.

Even in this eighth embodiment shown in FIG. 11, and in a manner similar to that according to the previously described first embodiment, the sensor signal processing circuit 60 includes, as best shown in FIG. 13A, electric and electronic components 63 such as an operational amplifier, a resistor or a microcomputer for processing an output signal from the strain sensor 23 and a semiconductor chip, on which circuit elements such as an electric power supply for driving the strain sensor 23 are integrated. On a surface of the insulating layer 50 (FIG. 4) are formed the electrode 64 for electrically connecting the strain sensor 23 and the electric and electronic components 63 together, the electrodes 65 which form wiring among the electric and electronic components 63 and a pad 68 for connection with a connector. A signal transmission from the sensor signal processing circuit 60 to the external device such as the electric control unit (ECU) of the automotive vehicle is carried out through a cable 69. For physically and electrically connect the cable 69 with the sensor signal processing circuit 60, the connector 81 is surface mounted on the pad 68. The connector 81 referred to above is provided with a connector cover 80 for protecting such connector 81.

Figure 13B:
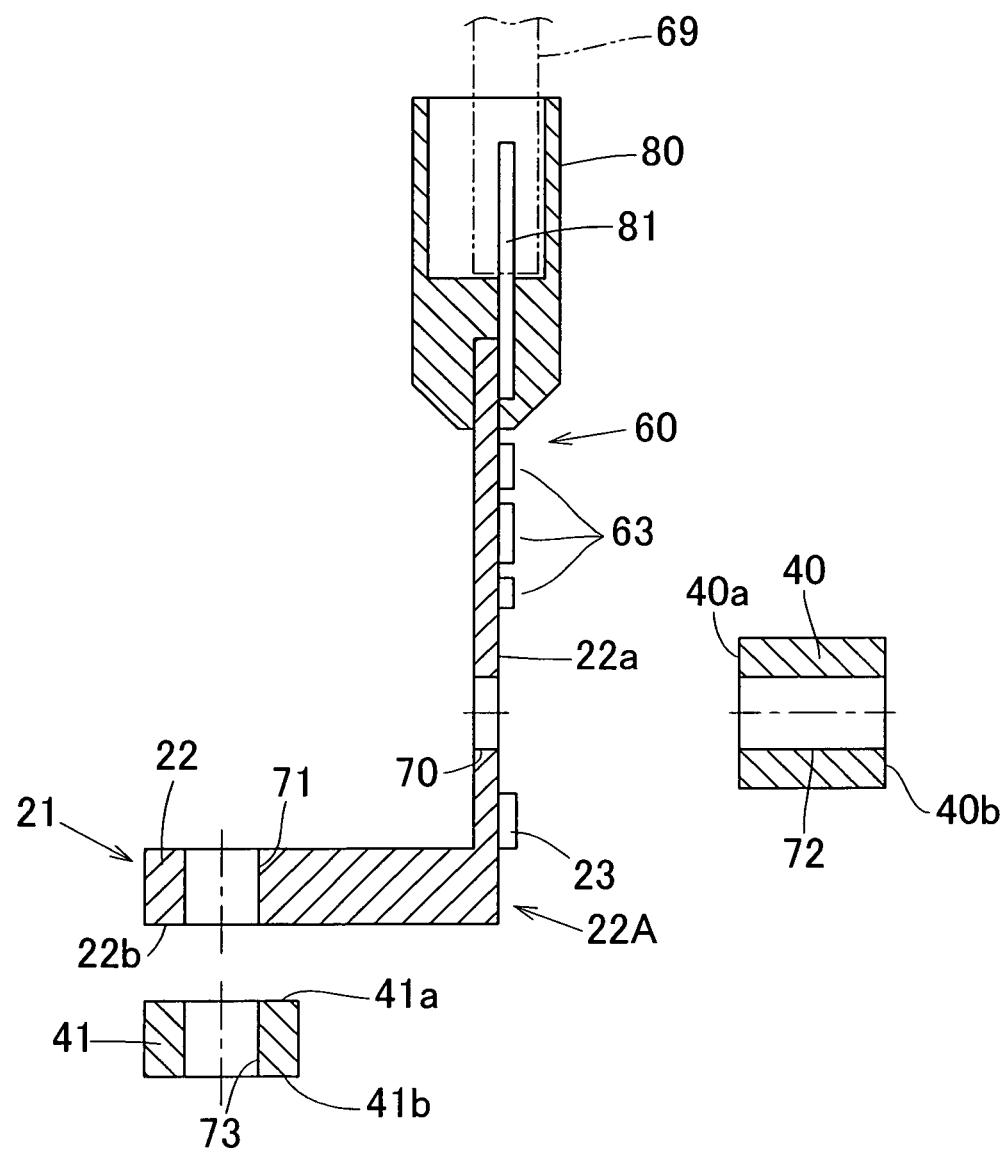
FIG. 13B is a side sectional view of FIG. 13A.

A method of making the sensor unit 21 will now be shown. At the outset, as shown in FIG. 4, an insulating material such as glass is printed and baked on a surface of the sensor mounting member 22, made of a metallic material such as stainless steel or the like, to thereby form the insulating layer 50. Then, an electroconductive material is printed and based on a surface of the insulating layer 50 to form the electrodes 51, 64 and 65 shown in FIG. 13A and the pad 68. In addition, as shown in FIG. 4, a material which eventually forms a resistor is printed and based between the pair of the electrodes 51 and 51 to thereby form the strain measuring resistor 52 and for protecting the electrodes 51 and 51 and the strain measuring resistor 52, the protective film 53 is formed. Thereafter, as best shown in FIGS. 13A and 13B, the sensor signal processing circuit 60 is provided on the sensor mounting member 22 and the electric and electronic components 63 are surface mounted. Also, the connector 81 is surface mounted on the connector connecting pad 68. Finally, the connector cover 80 is fitted. The connector cover 80 referred to above is fixed to the sensor mounting member 22 by means of a mechanical fixture such as screws, bonding or welding. For the welding, a laser heating method or an ultrasonic welding method can be employed.

In addition, since the signal transmitting path from the sensor signal processing circuit 60 to the external device such as the electric control unit (ECU) of the automotive vehicle is rendered to be in the form of the cable 69 and the connector 81 for physically and electrically connecting with the cable 69 is provided in the sensor signal processing circuit 60, the wiring work between the sensor signal processing circuit 60 and the external device can be simplified and the assemblability can become favorable. Yet, since the connector 81 is protected by the connector cover 80, the possibility of being affected by an external factor at the joint between the sensor signal processing circuit 60 and the cable 69 can be minimized. The connector 80 can be easily installed when fixed to the sensor mounting member 22.

Figure 14A:
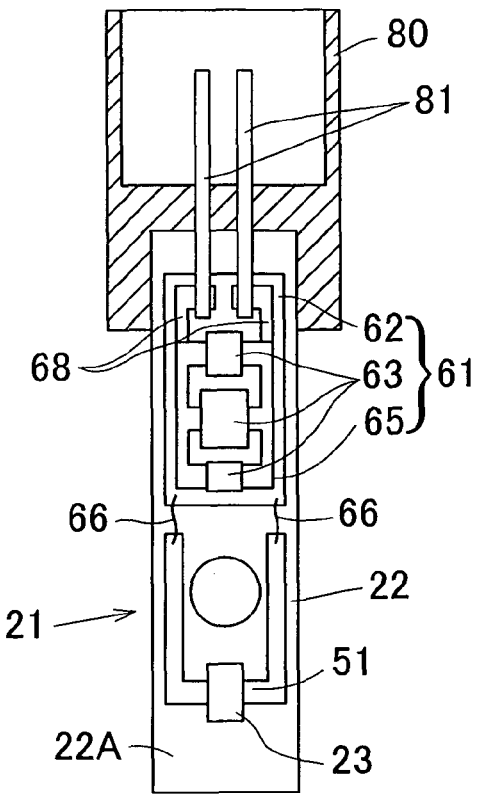
FIG. 14A is a fragmentary rear view showing different sensor units employed in the sensor equipped wheel support bearing assembly according to a ninth preferred embodiment of the present invention.
Figure 14B:
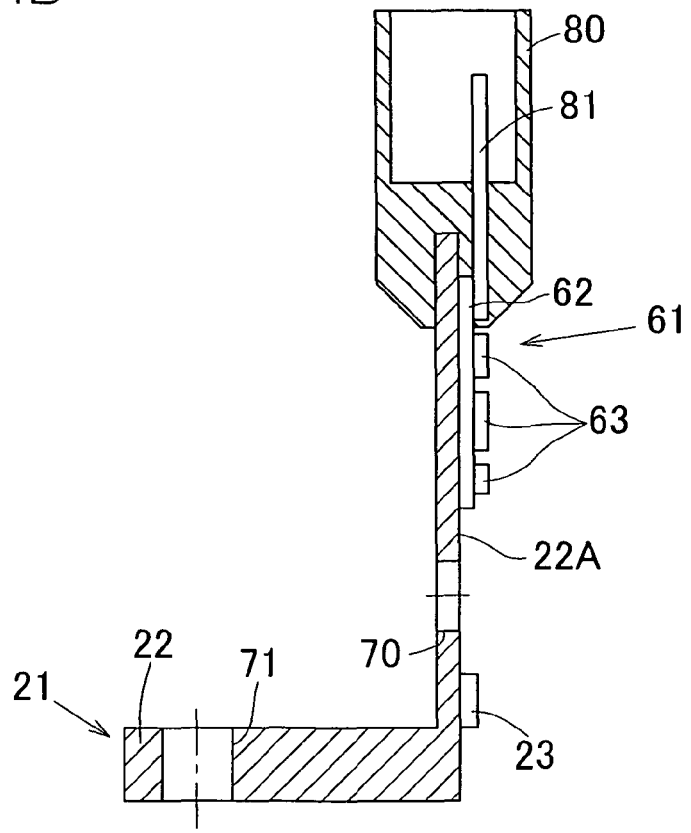
FIG. 14B is a side sectional view of FIG. 14A.

A ninth preferred embodiment of the present invention will now be described in detail with particular reference to FIGS. 14A and 14B. FIGS. 14A and 14B illustrate a sensor unit employed in the sensor equipped wheel support bearing assembly according to this ninth embodiment of the present invention, in which FIG. 14A is a fragmentary rear sectional view of the sensor unit and FIG. 14B is a side sectional view thereof. This illustrated sensor unit 21 includes a sensor mounting member 22, a strain sensor 23 for measuring a strain occurring in the sensor mounting member 22 and a sensor signal processing circuit substrate 61 on which a sensor signal processing circuit for processing an output from the strain sensor 23 are provided. The strain sensor 23 is formed on the sensor mounting surface 22A of the sensor mounting member 22 in the form of a thick film resistor in a manner similar to that described in connection with any one of the previously described embodiments.

The sensor signal processing circuit substrate 61 shown in FIGS. 14A and 14B is of a structure in which electric and electronic components 63 such as an operational amplifier, a resistor or a microcomputer for processing an output signal from the strain sensor 23 and a semiconductor chip, on which circuit elements such as an electric power supply for driving the strain sensor 23 are integrated, are arranged on a substrate material 62 fabricated with glass epoxy, with those components connected by means of electrodes 65 forming wirings. The electrode 51 of the strain sensor 23 and the electrode 65 of the sensor signal processing circuit substrate 61 are electrically connected with each other by means of a wire 66. In a manner similar to that described in connection with any one of the previous embodiments, the signal transmission from the sensor signal processing circuit substrate 61 to the external device such as the electric control unit (ECU) of the automotive vehicle is accomplished by means of a cable 69. For physically and electrically connecting the cable 69 with the sensor signal processing circuit substrate 61, a connector 81 is surface mounted on a pad 68 formed on the sensor signal processing circuit substrate 61. The connector 81 referred to above is provided with a connector cover 80 for protecting such connector 81.

A method of making the sensor unit 21 will now be described as follows. Even this making method is substantially similar to that for making the sensor unit 21 shown and described in connection with the eighth embodiment of the present invention, but differs therefrom in that in this embodiment the sensor signal processing circuit substrate 61 is employed in place of the sensor signal processing circuit 60, and the sensor signal processing circuit substrate 61 is fitted to the sensor mounting member 22 with the electrode 65 thereof connected with the electrode 51 of the strain sensor 23 by means of a wire 66. The electric and electronic components 63 may be surface mounted after the sensor signal processing circuit substrate 61 has been fitted to the sensor mounting member 22.

Even the ninth embodiment described above can bring about effects similar to those afforded by any one of the previously described embodiments. Specifically, the sensor for the detection of a load can be compactly installed on the automotive vehicle. The sensor signal processing circuit substrate 61 can be compactly installed. No wiring is required from the strain sensor 23 to the sensor signal processing circuit substrate 61 during the installation of the sensor unit 21 on the wheel support bearing assembly. The work required in wiring between the sensor signal processing circuit substrate 61 and the external device can be simplified and the assemblability is also high. The joint between the sensor signal processing circuit substrate 61 and the cable 69 is hardly affected by an external factor.

Figure 15:
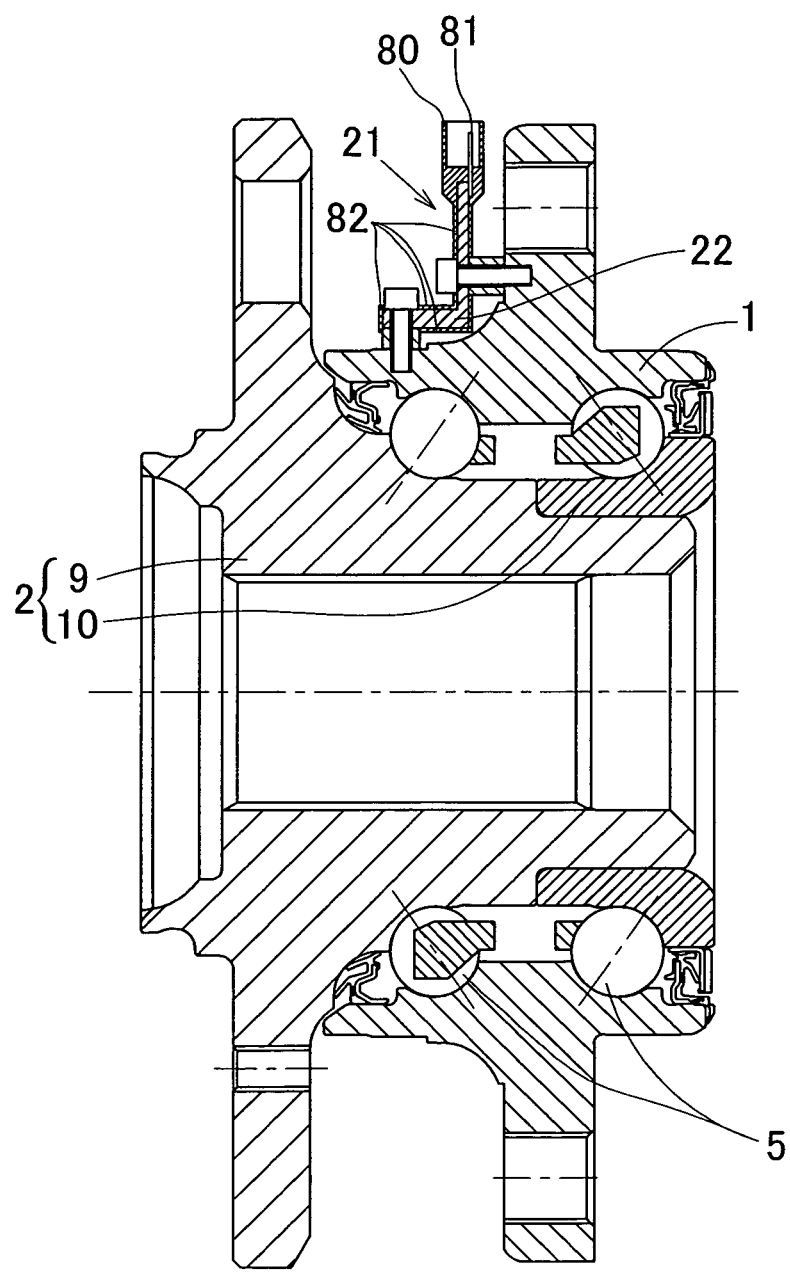
FIG. 15 is a sectional view showing the sensor equipped wheel support bearing assembly equipped with the sensor unit for the sensor equipped wheel support bearing assembly according to a tenth preferred embodiment of the present invention.

A tenth preferred embodiment of the present invention will be hereinafter described with particular reference to FIG. 15. FIG. 15 illustrates a sectional view of the wheel support bearing assembly equipped with the sensor unit. As shown therein, the sensor unit 21 employed in the practice of the tenth embodiment is of a type, in which a sensor mounting member cover 82 for protecting the surroundings of the sensor mounting member 22 is formed integrally with the connector cover 80. The provision of the sensor mounting member cover 82 integral with the connector cover 80 as described above is effective to protect the sensor unit 21 in its entirety and, accordingly, various parts of the sensor unit 21 will be hardly affected by external factors.

Although in any one of the foregoing embodiments of the present invention, the sensor mounting member 22, the first and second fixing members 40 and 41 and the outer member 1 are fixed together by the use of the bolts 76, such fixation may be made by the use of a bonding agent. Also, the both may be employed concurrently. In addition, without the bolts and the bonding agent employed, the sensor mounting member 22 and the fixing members 40 and 41 and the outer member 1 may be fixed together by means of welding. Even where any one of those methods of fixing is employed, the sensor mounting member 22 and the fixing members 40 and 41 and the outer member 1 can be fixed firmly. For this reason, there is no possibility that the sensor mounting member 22 may be displaced relative to the outer member 1 and the deformation occurring in the outer member 1 can be assuredly transmitted to the sensor mounting member 22.

It is to be noted that in describing any one of the foregoing embodiments of the present invention the outer member 1 is shown and described as serving the stationary member, the present invention can be equally applicable to the wheel support bearing assembly, in which the inner member serves as the stationary member and, in such case, the sensor unit 21 is provided on an inner periphery of the inner member.

Also, although the present invention has been shown and described as applied to the wheel support bearing assembly of the third generation type, the present invention can be equally applied to the wheel support bearing assembly of a first or second generation type, in which the bearing unit and the hub unit are component parts separate from each other and also to the wheel support bearing assembly of a fourth generation type, in which a part of the inner member is constituted by an outer ring of a constant velocity universal joint. Yet, the sensor incorporated wheel support bearing assembly of the present invention can be applied to that for the support of a vehicle driven wheel and also to the wheel support bearing assembly of any generation type utilizing tapered rollers.

[Applied Technology]

Hereinafter, the sensor equipped wheel support bearing assembly, which is different in basic construction from the present invention but forms an applied technology, will be described. The sensor equipped wheel support bearing assembly of a kind described hereinbefore has been described as intended to eliminate the problems and inconveniences inherent in the prior art (Japanese Published International Application No. 2003-530565) and has, for this purpose, been shown and described, in which the strain sensor is fitted to the sensor mounting member to define the sensor unit that is in turn fitted to the outer peripheral surface of the outer member.

However, in the case of the sensor equipped wheel support bearing assembly according to the present invention, since the outer peripheral surface of the outer member is susceptible to exposure to muddy water during the travel of the automotive vehicle, fitting of the sensor unit to the outer peripheral surface of the outer member, unless any appropriate protective measures is taken to the sensor unit, tends to pose such a problem that the sensor mounting member and the strain sensor will be susceptible to corrosion and/or deformation induced by influences brought about by change in external environment.

An object of this applied technology is to provide a sensor equipped wheel support bearing assembly of a type, in which a sensor for the detection of a load can be compactly installed on an automotive vehicle in a condition less susceptible to influences brought about by change in external environment, in which a load constantly acting on a vehicle wheel can be detected with high sensitivity, and in which the cost can be inexpensive during the mass production.

[Summary of the Applied Technology]

The sensor equipped wheel support bearing assembly according to the applied technology referred to above is a wheel support bearing assembly for rotatably supporting a vehicle wheel relative to a vehicle body structure, which includes an outer member having an inner periphery formed with double row rolling surfaces, an inner member having rolling surfaces defined therein so as to oppose to the respective rolling surfaces in the outer member, double row rolling elements interposed between the rolling surfaces in the outer member and the rolling surfaces in the inner member, and a sealing device for sealing each of the opposite ends of a bearing space delimited between the outer and inner members. A sensor mounting member and a sensor unit having at least one or more strain sensor fitted to the sensor mounting member are fitted to one of the outer and inner members which serves as a stationary member and the sensor unit is covered by a protective material.

In the event that a load acts on the rotatable member as the automotive vehicle starts traveling, the stationary member undergoes deformation through the rolling elements and such deformation brings about a strain in the sensor unit through the mounting member. The strain sensor provided in the sensor unit detects the strain occurring in the sensor unit. If the relation between the strain and the load is determined beforehand by means of a series of experiments and/or simulations, the load imposed on the vehicle wheel can be detected from an output of the strain sensor. Also, the load so detected can be utilized to control an automotive vehicle.

Since the wheel support bearing assembly of the present invention is of a design, in which the sensor unit including the sensor mounting member and the strain sensor fitted to the sensor mounting member is mounted on the stationary member, the sensor for detecting the load can be snugly and neatly installed in the automotive vehicle. Also, since the sensor unit is covered by the protective material, the sensor unit is less susceptible to influences brought about by a change in external environment such as occurring, for example, when exposed to muddy water and the strain sensor can detect the deformation of the stationary member at all times with high sensitivity. Since the sensor mounting member is a handy component part that is fitted to the stationary member, by fitting the strain sensor to the sensor mounting member, it can be excellent in mass production and the cost can be reduced.

In this applied technology, for the protective material, a molding member can be employed and for a molding material for the molding member, a high polymer material or an elastomer or a rubber material can be employed. Since the member for covering the sensor unit is employed in the form of the molding member, the sensor unit can easily be covered with high sealability. Since the sensor unit is protected by the molding member in this way, there is a minimized possibility of being affected by change in external environment. By way of example, even when the outer member is wetted with muddy water, the sensor unit will not be affected thereby. More specifically, neither corrosion nor deformation occurs in the sensor mounting member as well as the strain sensor. For this reason, the strain sensor can detect the deformation of the outer member at all times with high sensitivity.

In this applied technology, for the protective material, a cover can be employed and provided in the stationary member. Material for the cover may be, for example, metal, resin or rubber material. Also, fitting of the cover to the stationary member is preferably accomplished by the use of at least one of fitting methods utilizing screws, press-fitting technique and bonding technique. Even when the cover is employed in this way as the protective material, the sensor unit can be covered with a simplified structure and with high sealability in a manner similar to that achieved with the molding member and the sensor unit is less susceptible to influences brought about by change in external environment.

In the present invention, the strain sensor is preferably structured in the form of a thick film resistor. When the strain sensor is structured in the form of a thick film resistor, the strength with which the strain sensor is fitted to the sensor mounting member will not be lowered with aging in a manner similar to that achieved in each of the previously described various embodiments of the present invention and, therefore, the reliability of the sensor unit can be increased.

In this applied technology, a acting force estimation section is preferably provided for calculating an external force acting on the wheel support bearing assembly or a acting force acting between a wheel tire and a road surface in reference to an output from the strain sensor. When the external force acting on the wheel support bearing assembly or the acting force acting between the tire and the road surface, which is obtained by the acting force estimation section, is utilized in vehicle control of the automotive vehicle, a meticulous vehicle control can be achieved.

[Details of the Applied Technology]

Now a first mode of application of this applied technology will be described in detail with particular reference to FIGS. 16 to 18B. Even the sensor equipped wheel support bearing assembly according to this first mode of application is applied to an inner ring rotating model of a wheel support bearing assembly of a third generation type for rotatably supporting a vehicle drive wheel as is the case with that according to the previously described first embodiment of the present invention and like parts shown therein are therefore designated by like reference numerals employed in connection with the previously described first embodiment of the present invention.

Figure 16:
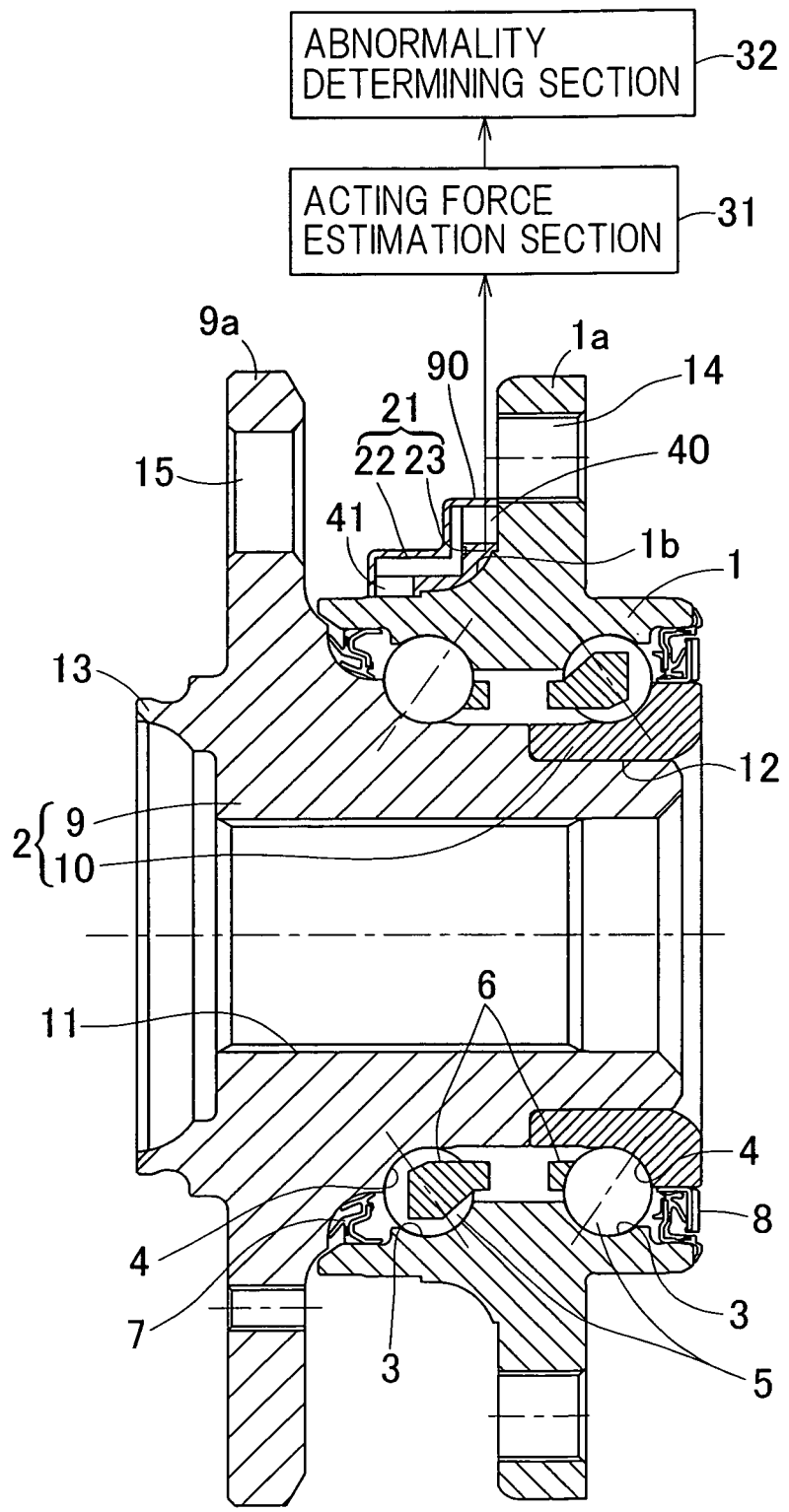
FIG. 16 is a diagram made up of a sectional view, showing the sensor equipped wheel support bearing assembly according to a first mode of application of applied technology of the present invention, and a block diagram showing a conceptual construction of the detecting system therefor.
Figure 17:
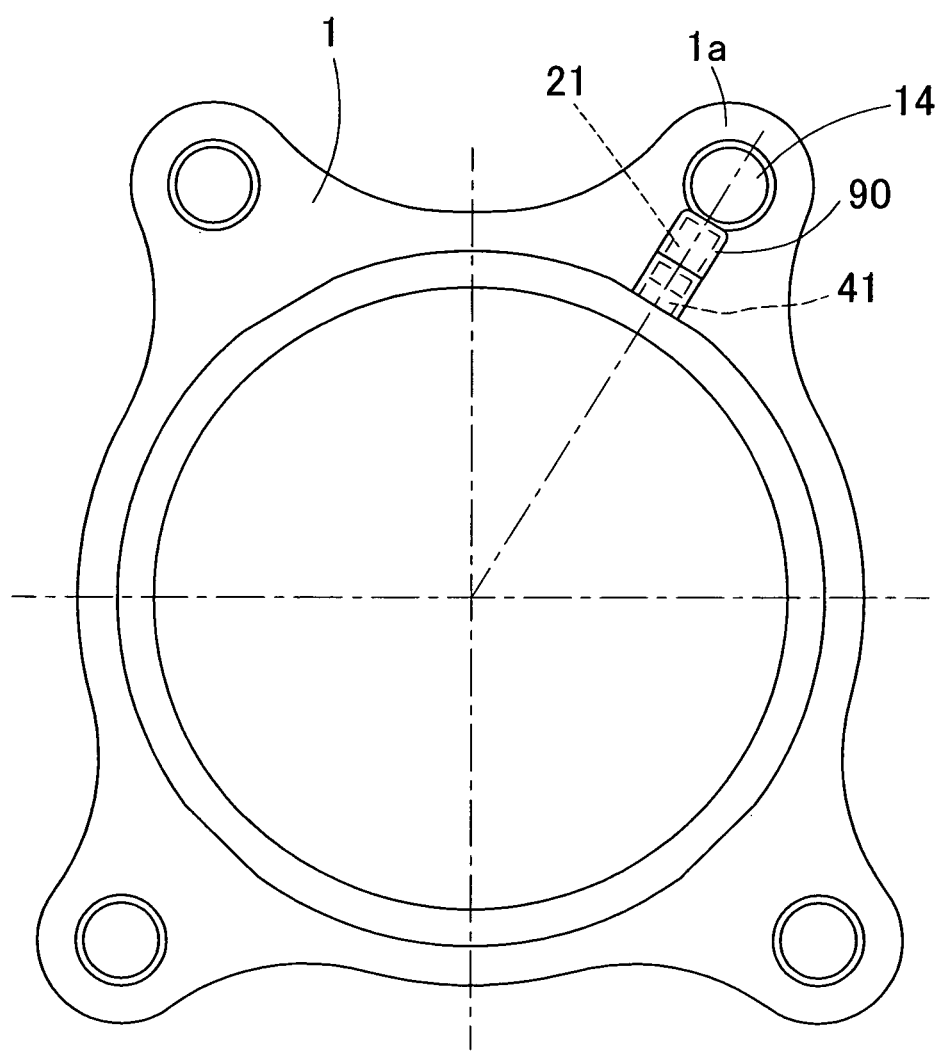
FIG. 17 is a front elevational view showing the outer member and the sensor unit both employed in the sensor equipped wheel support bearing assembly.

Referring particularly to FIG. 16, and in a manner similar to any one of the previously described embodiments of the present invention, the sensor incorporated wheel support bearing assembly according to this embodiment includes an outer member 1 having its inner periphery formed with double row rolling surfaces 3, an inner member 2 formed with rolling surfaces 4 confronting or in face-to-face relation with the respective rolling surfaces 3, and double row rolling elements 5 interposed between the rolling surfaces 3 of the outer member 1 and the rolling surfaces 4 of the inner member 2. This wheel support bearing assembly is rendered to be a double row angular contact ball bearing type, in which the rolling elements 5 are employed in the form of balls that are rollingly retained by retainers 6 employed for each row. The rolling surfaces 3 and 4 have arcuately sectioned shapes and the rolling surfaces 3 and 4 are so formed as to have a contact angle oriented outwardly. Opposite annular open ends of a bearing space delimited between the outer member 1 and the inner member 2 are sealed by respective sealing devices 7 and 8.

The outer member 1 is the one that serves as a stationary member and is of one-piece construction having its outer periphery formed with a flange 1a for securement to an automobile suspension system (not shown) mounted on the automotive vehicle. The flange 1a has a plurality of vehicle mounting holes 14 defined at a corresponding number of circumferential locations thereof.

The inner member 2 is the one that serves as a rotatable member and includes a hub unit 9 having a hub flange 9a for the support of a vehicle wheel and an inner ring 10 mounted on an inboard end of a hub axle 9b of the hub unit 9. The double row rolling surfaces 4 referred to previously are formed respectively in the hub unit 9 and the inner ring 10. The inboard end of the hub unit 9 has its outer periphery radially inwardly stepped to define an inner ring mounting area 12 of a reduced diameter, with the inner ring 10 fixedly mounted thereon. The hub unit 9 has a center bore 11 defined therein so as to extend axially completely through the length of the hub unit 9. The hub flange 9a has a plurality of press-fitting holes 15 defined in respective circumferential locations thereof for receiving corresponding hub bolts (not shown) press-fitted therein. The hub flange 9a of the hub unit 9 has a root portion thereof, adjacent the hub axle 9b, formed with a cylindrical pilot portion 13 so as to protrude in an outboard direction, which pilot portion 13 serves to guide the vehicle wheel and a brake component (not shown).

Figure 18A:
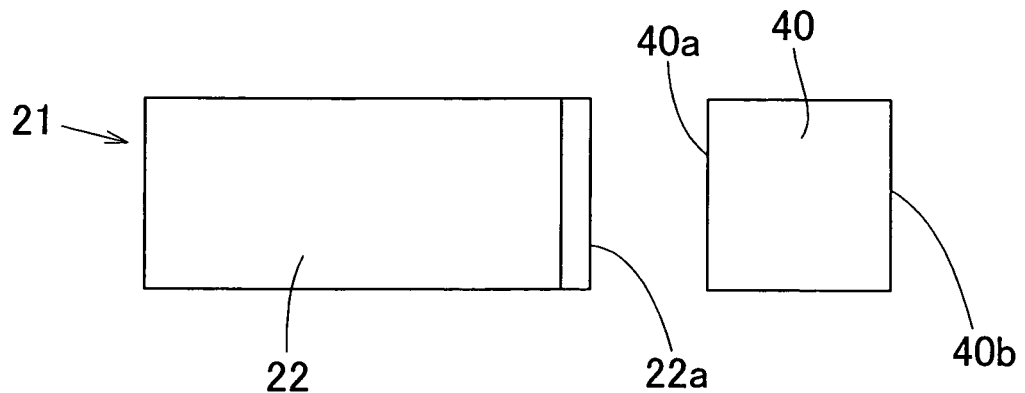
FIG. 18A is a top plan view showing the sensor unit and the first and second fitting members separated from each other.
Figure 18B:
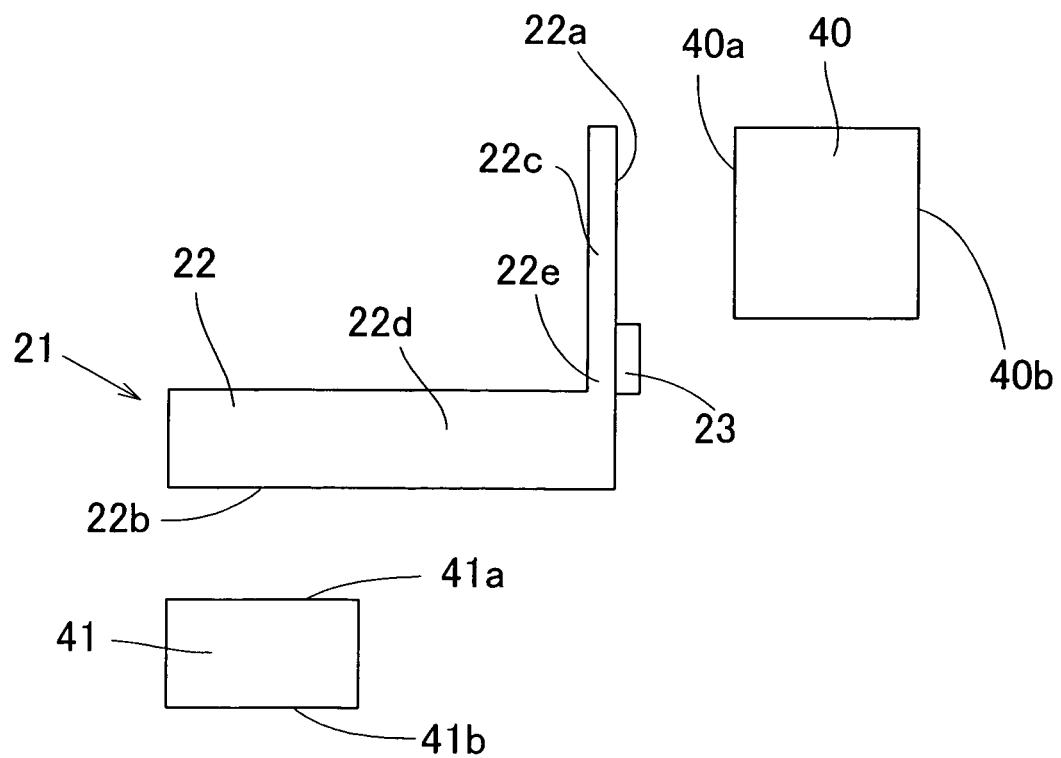
FIG. 18B is a side view of FIG. 18A.

A sensor unit 21 shown in FIGS. 18A and 18B is mounted on an outer peripheral portion of the outer member 1. This sensor unit 21 includes a sensor mounting member 22, a strain sensor 23 for measuring a strain induced in such sensor mounting member 22 and a sensor signal processing circuit 60 for processing an output signal from the strain sensor 23. The sensor unit 21 is fitted to the outer member 1 through first and second fitting members 40 and 41.

The sensor mounting member 22 includes a first contact fixing portion 22a adapted to be fixed to the first fixing member 40 in contact therewith and a second contact fixing portion 22b adapted to be fixed to the second fixing member 41 in contact therewith. This sensor mounting member 22 is of a L-shaped configuration having a radially extending portion 22c extending in a radial direction and an axially extending portion 22d extending in an axial direction, and an intermediate area of the radially extending portion 22c is rendered to be the first contact fixing portion 22a whereas a free end area of the axially extending portion 22d is rendered to be the second contact fixing portion 22b. The radially extending portion 22c has a wall thickness reduced to have a lowered rigidity as compared with that of the axially extending portion 22d. The strain sensor 23 is fitted to the radially extending portion 22c of a low rigidity.

The first fixing member 40 includes a sensor unit side contact fixing portion 40a adapted to be fixed to the first contact fixing portion 22a of the sensor mounting member 22 in contact therewith and an outer member side contact fixing portion 40b adapted to be fixed in the vicinity of the vehicle body fitting hole 14 in the outer member 1 in contact therewith. Also, the second fixing member 41 includes a sensor unit side contact fixing portion 41a adapted to be fixed to the second contact fixing portion 22b of the sensor mounting member 22 in contact therewith and an outer member side contact fixing portion 41b adapted to be fixed to the outer peripheral surface of the outer member 1 in contact therewith.

As is the case with that shown in, for example, FIG. 4 showing the previously described first embodiment of the present invention, the strain sensor 23 is formed on the sensor mounting surface 22A of the sensor mounting member 22 in the form of a thick film resistor. In other words, it is of such a structure that an insulating layer 50 is formed on the sensor mounting surface 22A; electrodes 51 and 51 forming a pair are formed on opposite surface portions of the insulating layer 50; a strain measuring resistor 52 in the form of the thick film resistor, which defines the strain sensor, is formed on the insulating layer 50 so as to bridge between those electrodes 51 and 51; and a protective film 53 is formed over the electrodes 51 and 51 and the strain measuring resistor 52.

A method of making the sensor unit 21 is shown as follows. At the outset, an insulating material such as glass is printed and baked on a surface of the sensor mounting member 22, made of a metallic material such as stainless steel or the like, to thereby form the insulating layer 50. Then, an electroconductive material is printed and based on a surface of the insulating layer 50 to form the electrodes 51. In addition, a material which eventually forms a resistor is printed and based between the pair of the electrodes 51 and 51 to thereby form the strain measuring resistor 52. Yet, for protecting the electrodes 51 and 51 and the strain measuring resistor 52, the protective film 53 is formed as mentioned above.

For the strain sensor 23, other than that formed in the form of the thick film resistor, various types can be employed. By way of example, the strain sensor 23 can be employed in the form of a metallic foil strain gauge. In such case, fixation to the sensor mounting member 22 is generally carried out by means of bonding.

The sensor unit 21 referred to above is fixed to an outer peripheral portion of the outer member 1 through the first and second fixing members 40 and 41 so that the first and second contact fixing portions 22a and 22b of the sensor mounting member 22 are held in respective positions on the same phase with respect to the circumferential direction of the outer member 1. Fixture of the first and second fixing members 40 and 41 to the outer member 1 is accomplished by means of, for example, bonding with the use of a bonding agent. As best shown in FIG. 3, when the first and second contact fixing portions 22a and 22b are held on the same phase with respect to the circumferential direction, the sensor mounting member 22 can have a reduced length and, accordingly, the sensor unit 21 can be easily installed.

In addition, after the sensor unit 21 has been fixed to the outer member 1, the surroundings of the sensor unit 21 and the fixing members 40 and 41 are covered by a molding member 90. Material for the molding member 90 can be suitably employed in the form of, for example, a high polymer material or an elastomer or a rubber material. The molding member 90 can be formed by, for example, a mold forming technique, in which a mold assembly for covering the sensor unit 21 is arranged in the outer member 1, then a molding material in a melted condition is injected into the mold assembly and finally the injected molding material is cured. This molding member may be formed by a coating technique.

As shown in FIG. 16, as a means for processing the output from the strain sensor 23, a acting force estimation section 31 and an abnormality determining section 32 are provided. Those sections 31 and 32 may be provided either in the sensor signal processing circuit (not shown) of the wheel support bearing assembly or in the electric control unit (ECU) of the automotive vehicle.

The operation of the wheel support bearing assembly of the structure hereinabove described will now be described. When a load is applied to the hub unit 9 shown in FIG. 1, the outer member 1 is deformed through the rolling elements 5. Deformation of the outer member 1 is in turn transmitted to the sensor mounting member 22 through the first and second fixing members 40 and 41, resulting in deformation of the sensor mounting member 22. Strain occurring in the sensor mounting member 22 is measured by the strain sensor 23. At this time, the radially extending portion 22c of the sensor mounting member 22 deforms in response to deformation of the flange 1a integral or rigid with the outer member 1. In the case of this first mode of application now under discussion, as shown in FIG. 18B, since as compared with the outer member 1, the radially extending portion 22c has a low rigidity and the sensor mounting member 22 is so structured as to represent the L-shaped configuration including the radially extending portion 22c of a low rigidity and the axially extending portion 22d of a high rigidity, the strain concentrated in the vicinity of a corner area 22e, which lies intermediate between the radially extending portion 22c and the axially extending portion 22d and which is rather adjacent to the radially extending portion 22c, resulting in that a strain higher than that in the outer member 1 appears. In other words, the strain developing intermediate between the radially extending portion 22c and the axially extending portion 22d can be considered corresponding to the strain occurring in an R portion 1b (FIG. 16) at the root of the flange 1a, which has been transcribed and expanded. Since this strain is measured by the strain sensor 23, the strain occurring in the outer member 1 can be detected with high sensitivity and, hence, the strain measuring precision can be increased.

Since the sensor unit 21 is protected by the molding member 90, there is a minimized possibility of being affected by change in external environment. By way of example, even when the outer member 1 is wetted with muddy water, the sensor unit 21 will not be affected thereby. More specifically, neither corrosion nor deformation occurs in the sensor mounting member 22 as well as the strain sensor 23. For this reason, the strain sensor 23 can detect the deformation of the outer member 1 at all times with high sensitivity.

Since the manner of change of the strain varies depending on the direction and the magnitude of the load, by determining the relation between the strain and the load beforehand by means of a series of experiments and/or simulations, the external force acting on the wheel support bearing assembly or the working force between the vehicle tire and the road surface can be calculated. The acting force estimation section 31 referred to previously is operable to calculate the external force acting on the wheel support bearing assembly or the working force between the vehicle tire and the road surface in reference to an output from the strain sensor 23 by the utilization of the relation between the strain and the load which has been determined by means of the experiments and/or simulations. The abnormality determining section 32 referred to previously is operable to output an abnormality signal to the outside when the section 32 determines that the external force acting on the wheel support bearing assembly or the working force between the vehicle tire and the road surface, which has been calculated by the acting force estimation section 31, exceeds a tolerance. This abnormality signal can be used in a vehicle control of the automotive vehicle. Also, when the external force acting on the wheel support bearing assembly or the working force between the vehicle tire and the road surface is detected in real time, a meticulous vehicle control can be carried out.

The sensor unit 21 of the construction according to this first mode of application, including the sensor mounting member 22 and the strain sensor 23 fitted to this sensor mounting member 22, is fitted to the outer member 1 and, therefore, the sensor for the detection of the load can be compactly installed on the automotive vehicle. Also, since the sensor unit 21 is fitted to the outer member 1 through the first and second fixing members 40 and 41, not directly to the outer member 1, the sensor mounting member 22 can have a simplified L-shaped configuration. When the sensor mounting member 22 is of such a simplified shape, the sensor mounting member 22 can easily be processed and the production cost thereof can be reduced. Also, when the sensor mounting member 22 is of such a simplified shape, respective position at which the strain sensor 23 is fixed can be precisely set. In the case of this first mode of application, since the surface of the sensor mounting member 22, on which the strain sensor 23 is provided, is flat, it is easy to form the strain sensor 23 on the surface of the sensor mounting member 22 in the form of a thick film resistor.

Where the strain sensor 23 is structured by a metallic foil strain gauge, the strain sensor 23 is generally fixed in position by bonding to the sensor mounting member 22. However, the fixing by bonding involves the possibility that reduction in bonding strength resulting from aging will adversely affect the detection by the strain sensor 23. Also, since a substantial length of time is required in a bonding work, it will constitute a cause of increase of the production cost. In contrast thereto, when the sensor unit 21 is formed with the strain sensor 23 formed on the sensor mounting surface 22A of the sensor mounting member 22 in the form of a thick film resistor such as shown in FIG. 4 common to the applied technology, no substantial reduction in bonding strength resulting from aging will occur and, therefore, the reliability of the sensor unit 21 can be increased. Moreover, since no bonding work is required for the strain sensor 23, the assemblability can be increased to thereby reduce the production cost.

Figure 19:
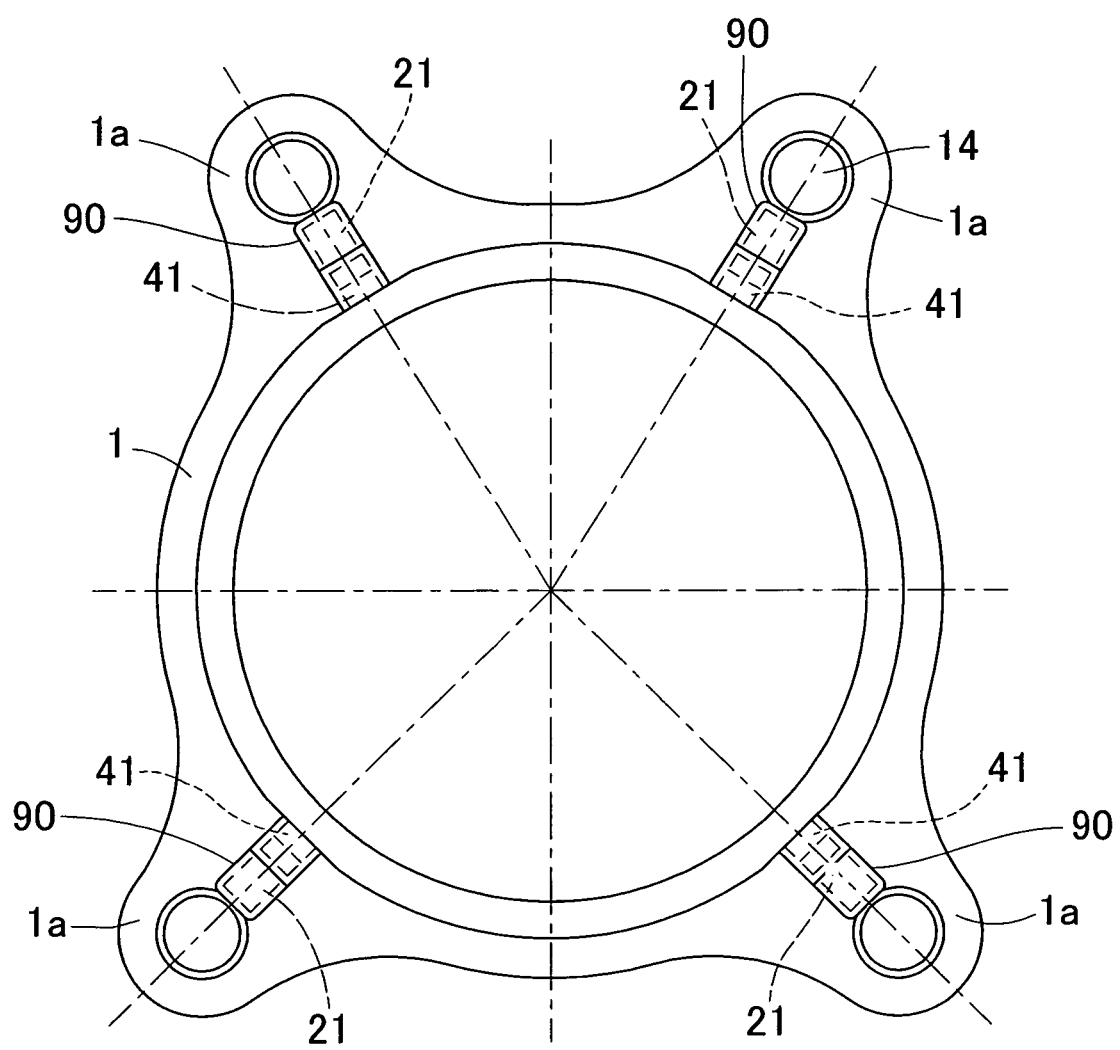
FIG. 19 is a front elevational view showing the outer member and the sensor unit both employed in the sensor equipped wheel support bearing assembly according to a second mode of application of the applied technology of the present invention.

Although the first mode of application described hereinabove is such that the sensor unit 21 is provided at only one location of the outer member 1, the sensor unit 21 may be positioned at, for example, two or more locations such as in a second mode of application shown in FIG. 19. Even where the sensor unit 21 is provided at two or more locations, each of the sensor units 21 has to be covered by the molding member 90. When the sensor unit 21 is provided at two or more locations, a further highly precise load detection can be achieved.

Figure 20:
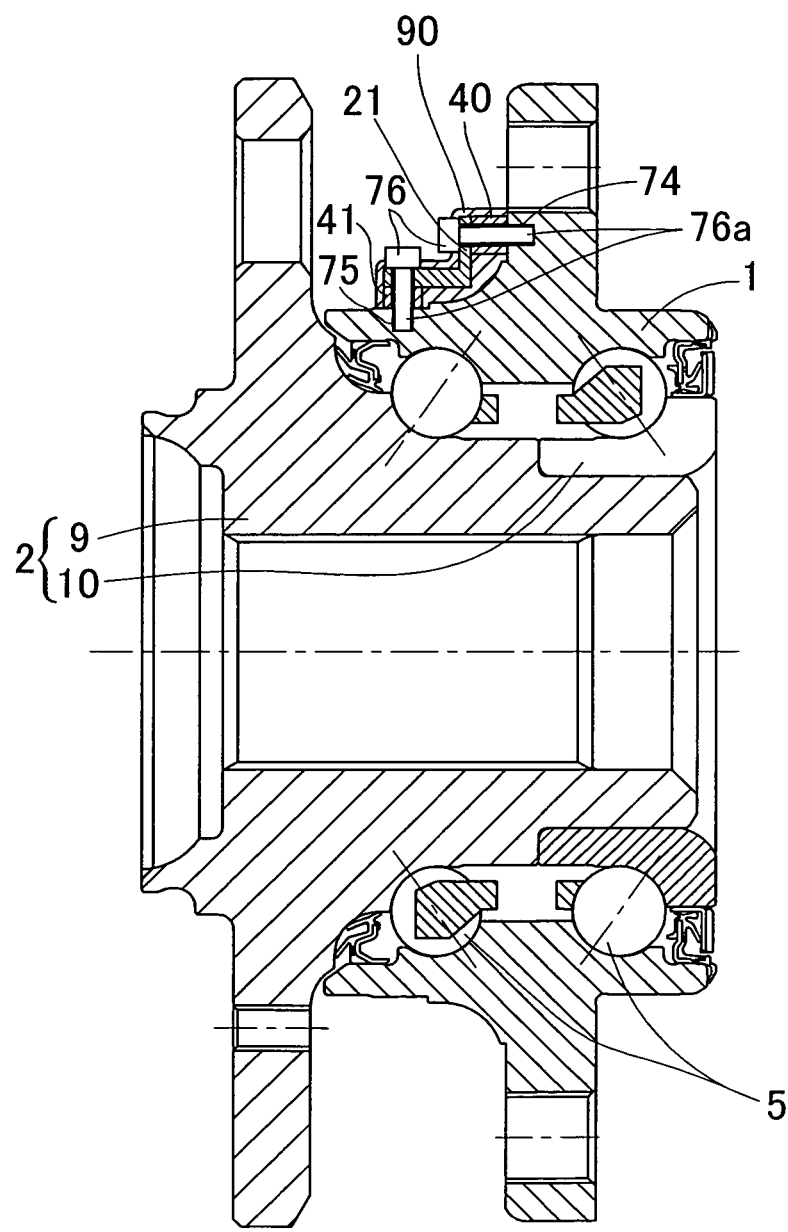
FIG. 20 is a side view showing the sensor equipped wheel support bearing assembly according to a third mode of application of the applied technology of the present invention.
Figure 21A:
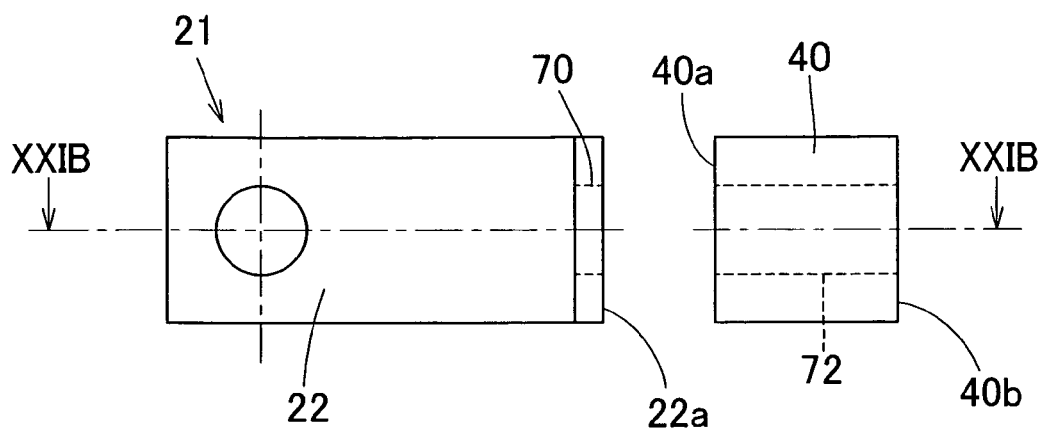
FIG. 21A is a top plan view showing the sensor unit and the first and second fitting member separated from each other.
Figure 21B:
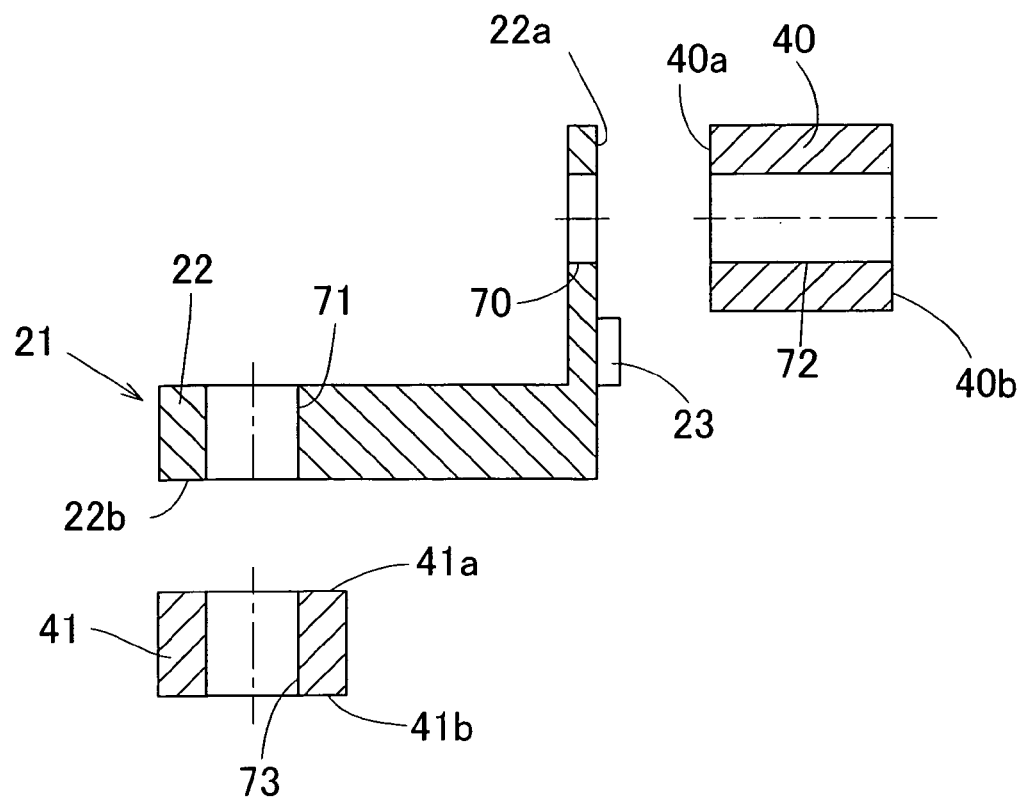
FIG. 21B is a cross sectional view taken along the line XXIB-XXIB in FIG. 21A.

FIGS. 20, 21A and 21B illustrate a third mode of application. In the wheel support bearing assembly according to this mode of application, the sensor mounting member 22, the first and second fixing members 40 and 41 and the outer member 1 are fixed together by the use of bolts 76. This sensor mounting member 22 has an entire shape identical with that of the sensor mounting member 22 shown in FIG. 18 and is of a structure, in which an axially extending bolt insertion hole 70 is formed in the first contact fixing portion 22a and a radially extending bolt insertion hole 71 is formed in the second contact fixing portion 22b. Also, the first fixing member 40 is formed with a bolt insertion hole 72 cooperable with the bolt insertion hole 70 and the second fixing member 41 is formed with a bolt insertion hole 73 cooperable with the bolt insertion hole 71. In addition, as best shown in FIG. 20, the outer member 1 is formed with bolt threading holes 74 and 75, each having a peripheral surface formed with female threads, at a position alignable with the bolt insertion holes 70 and 72 and at a position alignable with the bolt insertion holes 71 and 73, respectively.

As shown in FIG. 20, the sensor unit 21 is fixed to the outer member 1 by inserting the bolt 76 from an outboard side into the bolt insertion hole 70 in the sensor mounting member 22 and the bolt insertion hole 72 in the first fixing member 40 and threading a male thread portion 76a of such bolt 76 into the bolt threading hole 74 in the outer member 1 and, on the other hand, by inserting the bolt 76 from an outer peripheral side into the bolt insertion hole 71 in the sensor mounting member 22 and the bolt insertion hole 73 in the second fixing member 41 and threading a male thread portion 76a of the bolt 76 into the bolt threading hole 75 in the outer member 1. Also, in a manner similar to that described previously, after the sensor unit 21 has been fixed to the outer member 1, the surroundings of the sensor unit 21 and the fixing members 40 and 41 are covered by the molding member 90.

The sensor mounting member 22, the first and second fixing members 40 and 41 and the outer member 1 may be fixed together by the use of either bolts 76 or a bonding agent. Also, the both may be employed concurrently. In addition, without the bolts and the bonding agent employed, the sensor mounting member 22 and the outer member 1 may be fixed together by means of welding. Even where any one of those methods of fixing is employed, the sensor mounting member 22 and the fixing members 40 and 41 and the outer member 1 can be fixed firmly. For this reason, there is no possibility that the sensor mounting member 22 may be displaced relative to the outer member 1 and the deformation occurring in the outer member 1 can be assuredly transmitted to the sensor mounting member 22.

Although in any one of the first to third modes of application discussed above, the molding member 90 has been described as used to cover after the sensor unit 21 has been fixed to the outer member 1, an assembly including the fixing members 40 and 41 fixed to the sensor unit 21 is first covered by the molding member 90 and is then fixed to the outer member 1.

Figure 22:
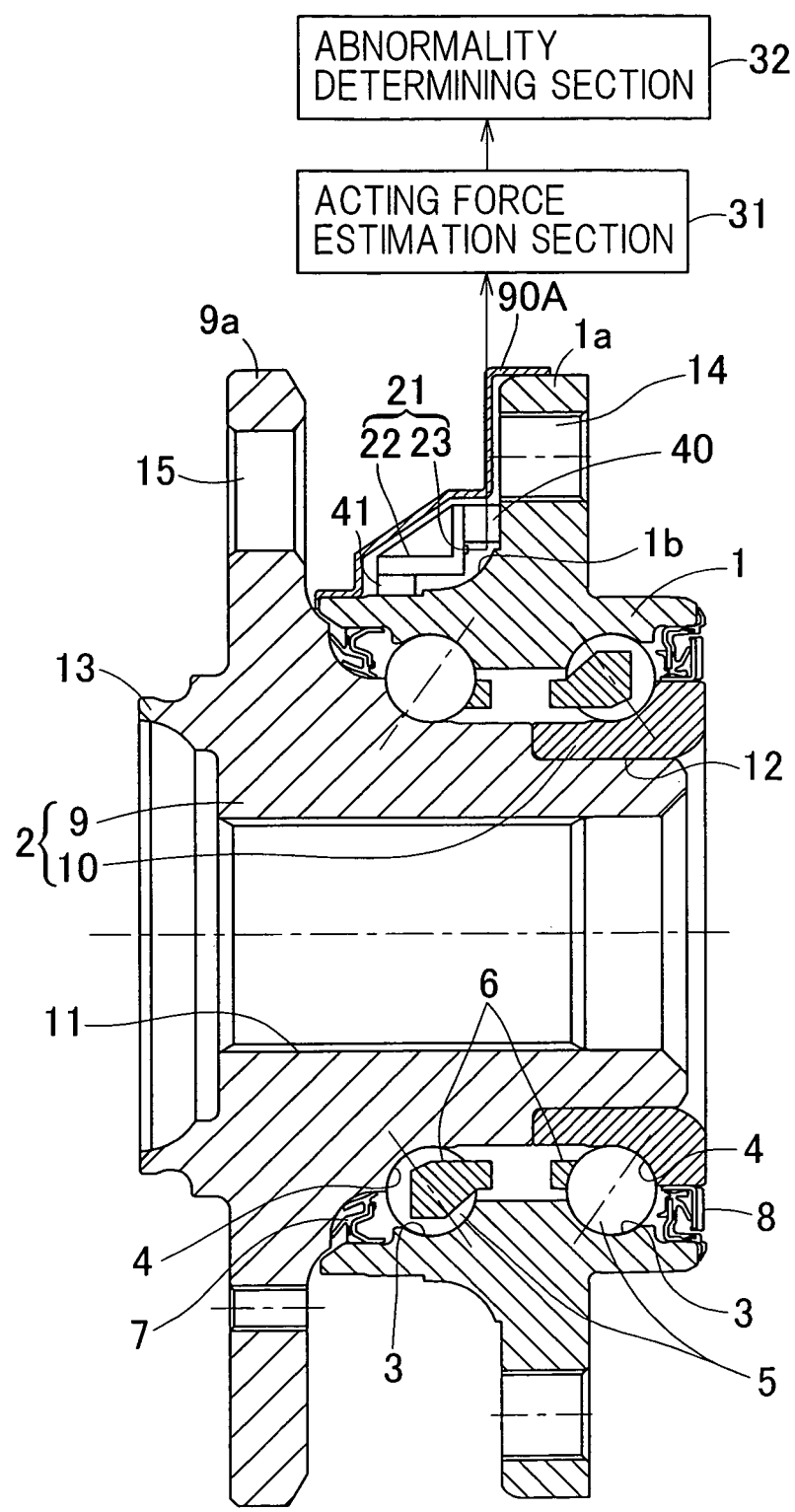
FIG. 22 is a diagram made up of a sectional view, showing the sensor equipped wheel support bearing assembly according to a fourth mode of application of the applied technology of the present invention, and a block diagram showing a conceptual construction of the detecting system therefor.
Figure 23:
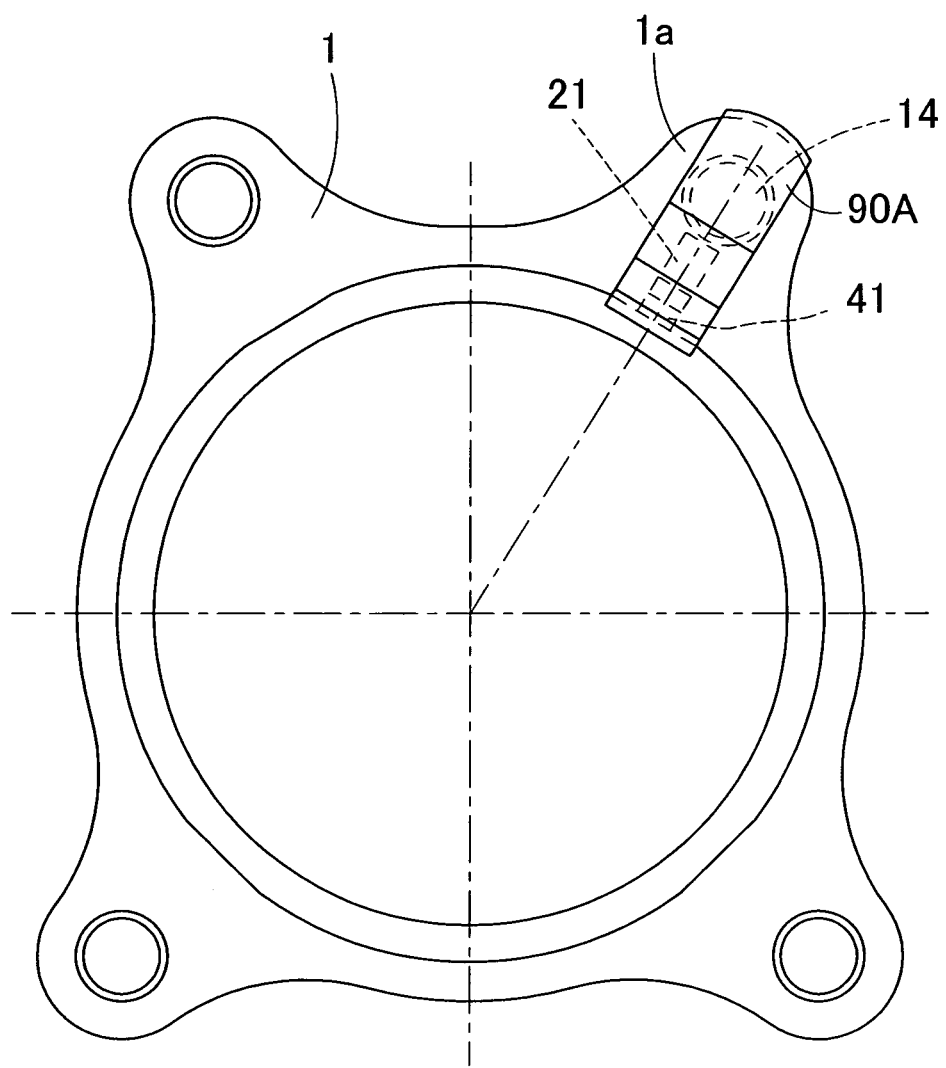
FIG. 23 is a front elevational view showing the outer member and the sensor unit both employed in the sensor equipped wheel support bearing assembly.

In the next place, a fourth mode of application of the applied technology will be described with particular reference to FIGS. 22 and 23. FIG. 22 corresponds to FIG. 16 showing the first mode of application and, therefore, like parts are designated by like reference numeral and the details thereof are not reiterated, noting that only the difference therebetween will be described hereinafter.

Figure 24:
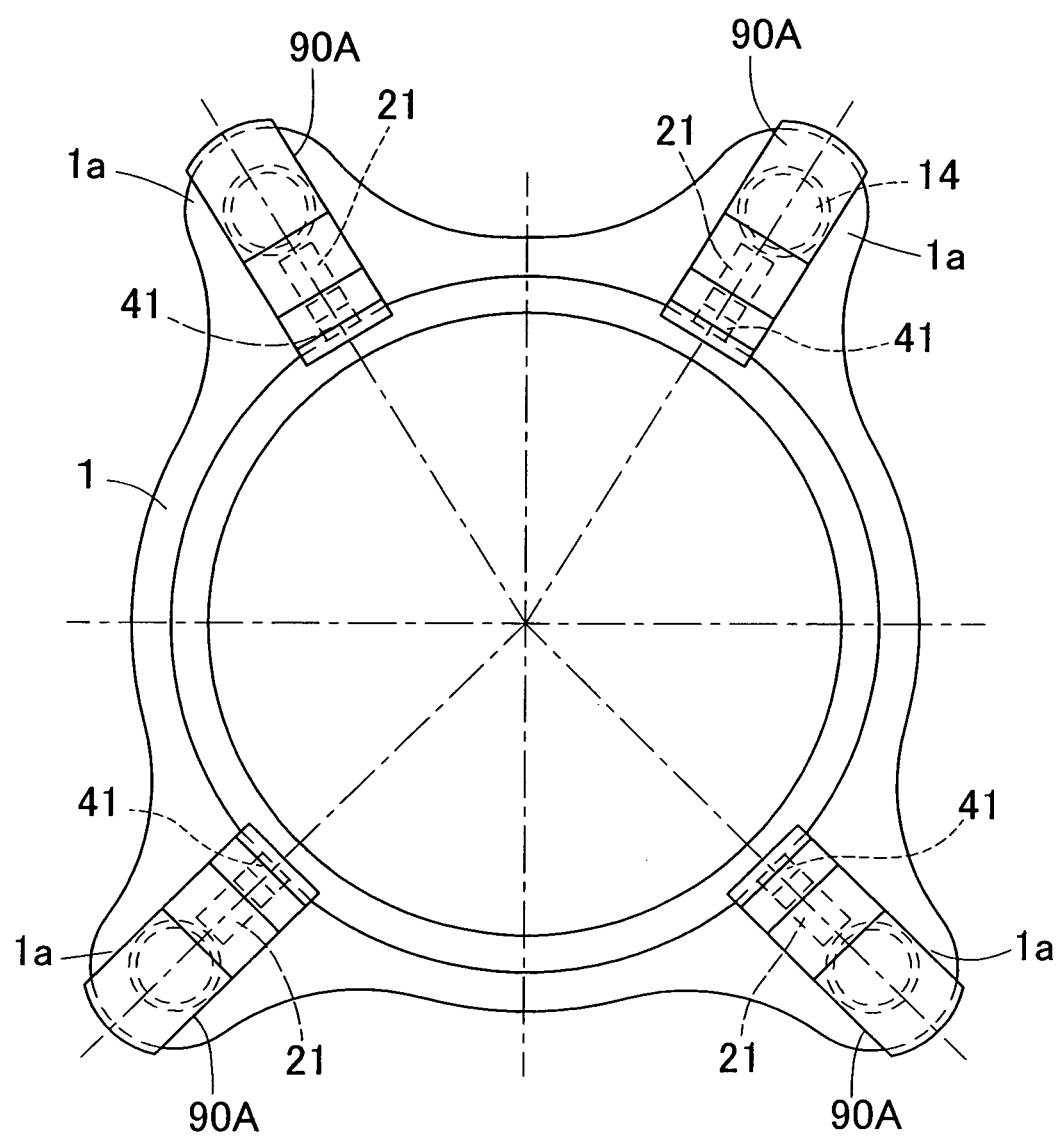
FIG. 24 is a front elevational view showing the outer member and the sensor unit both employed in the sensor equipped wheel support bearing assembly according to a fifth mode of application of the applied technology of the present invention.

Referring to FIG. 22, in the fourth mode of application, after the sensor unit 21 has been fixed to the outer member 1, a cover 90A for protecting this sensor unit 21 is fitted to the outer member 1. In this embodiment, the cover 90A is fitted to the outer member 1 so that opposite ends of the cover 90A can be engaged with an outboard end of the outer member 1 and an outer peripheral edge portion of the flange 1a, respectively. Material for the cover 90A may be selected from the group consisting of, for example, metal, resin and rubber material. Also, fitting of the cover 90A to the outer member 1 can be accomplished by the utilization of at least one of fitting methods including the use of screws, press-fitting technique and bonding technique. Although the sensor unit 21 referred to above is, as shown in FIG. 23, fitted to only one location of the outer member 1, the sensor units 21 may be provided at two or more location as is the case with a fifth mode of application shown in FIG. 24. Even where the sensor unit 21 is provided at two or more locations, each of those sensor units 21 has to be covered by the cover 90A. When the sensor unit 21 is provided at two or more locations, a further highly precise load detection can be accomplished.

Figure 25:
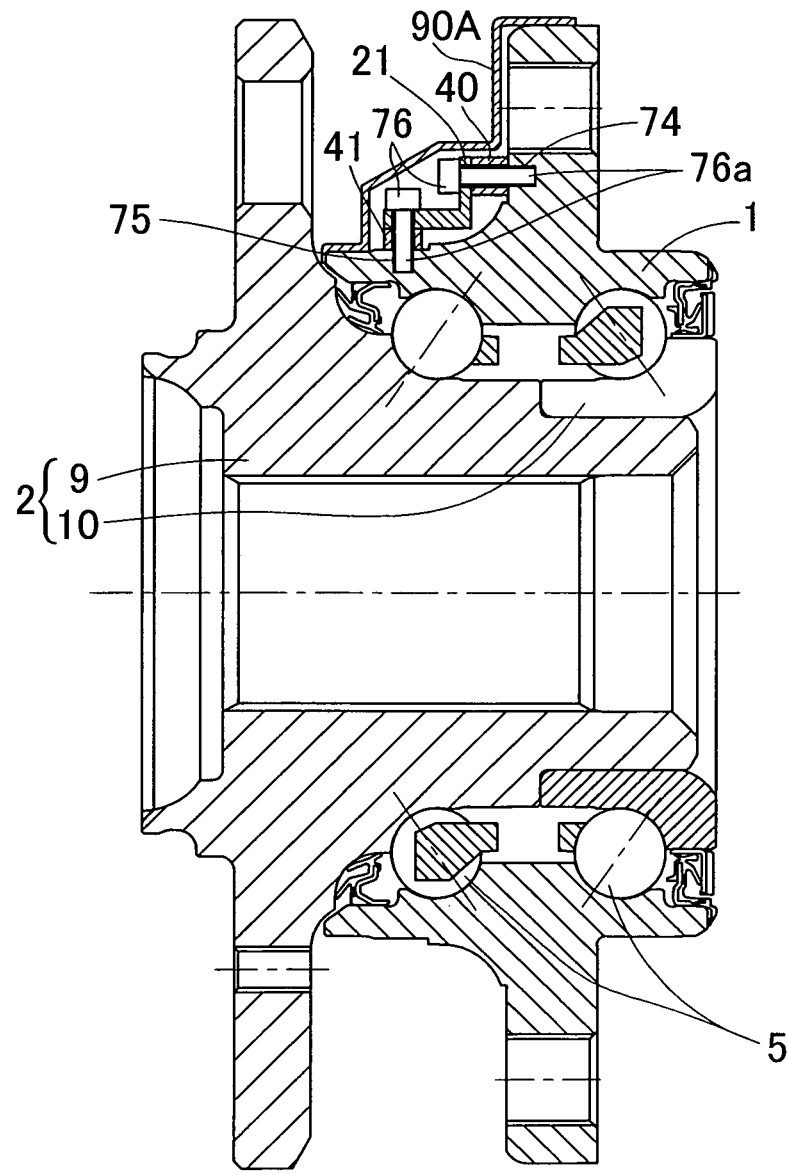
FIG. 25 is a sectional view showing the sensor equipped wheel support bearing assembly according to a sixth mode of application of the applied technology of the present invention.

A sixth mode of application will now be described with particular reference to FIG. 25 corresponding to FIG. 20. Even in the wheel support bearing assembly according to this sixth mode of application, as is the case with the third mode of application shown in and described with reference to FIG. 20, the sensor mounting member 22, the first and second fixing members 40 and 41 and the outer member 1 are fixed together by the use of bolts. However, this sixth mode of application differs from the third mode of application in that while in the third mode of application, the molding member 90 has been shown and employed as a protecting material, the sixth mode of application makes use of such a cover 90A as best shown in FIG. 25. The cover 90A for protecting the sensor unit 21 is fitted to the outer member 1 after the sensor unit 21 has been fixed to the outer member 1.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A sensor equipped wheel support bearing assembly for rotatably supporting a vehicle wheel relative to a vehicle body structure, comprising:

an outer member having an inner periphery formed with double row rolling surfaces;

an inner member having rolling surfaces formed therein in face-to-face relation with the rolling surfaces in the outer member;

double row rolling elements interposed between those opposed rolling surfaces;

a sealing device to seal each of opposite ends of a bearing space delimited between the outer member and the inner member;

a sensor unit fitted to one of the outer and inner members, which serves as a stationary member, through first and second fitting members and including a sensor mounting member and at least one or more strain sensors fitted to the sensor mounting member; and a sensor signal processing circuit provided in the sensor mounting member to process an output signal from the strain sensor, wherein the sensor mounting member is of a L-shaped configuration having a radially extending portion to extend in a radial direction and an axially extending portion to extend in an axial direction, wherein the sensor mounting member includes a first contact fixing portion adapted to be fixed to the first fitting member in contact therewith and a second contact fixing portion adapted to be fixed to the second fitting member in contact therewith, wherein the first contact fixing portion is provided at the radially extending portion and the second contact fixing portion is provided at the axially extending portion, and wherein the radially extending portion has a lowered rigidity as compared with that of the axially extending portion, wherein the strain sensor is arranged in a sensor mounting surface, which is an inboard side surface of the radially extending portion, at a location radially inwardly of the first contact fixing portion.

2. The sensor equipped wheel support bearing assembly as claimed in claim 1, wherein the sensor signal processing circuit is formed in a sensor signal processing circuit substrate, which is fitted to the sensor mounting member.

3. The sensor equipped wheel support bearing assembly as claimed in claim 2, further comprising:
a cable forming a signal transmitting path from the sensor signal processing circuit substrate to an external device;
a connector to physically bond and electrically connect between the sensor signal processing circuit substrate and the cable; and
a cover fixed to the sensor mounting member to protect the connector.

4. The sensor equipped wheel support bearing assembly as claimed in claim 1, wherein the sensor signal processing circuit is arranged in the sensor mounting surface at a location radially outwardly of the first contact fixing portion.

5. The sensor equipped wheel support bearing assembly as claimed in claim 4, wherein the sensor signal processing circuit is arranged on an inner surface of the axially extending portion of the sensor mounting member.

6. The sensor equipped wheel support bearing assembly as claimed in claim 5, wherein the strain sensor and the sensor signal processing circuit are electrically connected with each other by a wire.

7. The sensor equipped wheel support bearing assembly as claimed in claim 1, wherein the sensor signal processing circuit is provided on a surface of the radially extending portion in the sensor mounting member opposite to the sensor mounting surface thereof.

8. The sensor equipped wheel support bearing assembly as claimed in claim 7, wherein the strain sensor and the sensor signal processing circuit are electrically connected with each other by a pin inserted so as to extend through the radially extending portion.

9. The sensor equipped wheel support bearing assembly as claimed in claim 1, wherein a signal transmitting path from the sensor signal processing circuit to an external device is a cable.

10. The sensor equipped wheel support bearing assembly as claimed in claim 9, further comprising a pad for connection with the cable, the pad being formed in the sensor signal processing circuit.

11. The sensor equipped wheel support bearing assembly as claimed in claim 1, wherein the strain sensor is formed of a thick film resistor.

12. The sensor equipped wheel support bearing assembly as claimed in claim 1, further comprising an acting force estimation section operable to calculate an external force acting on the wheel support bearing assembly or a acting force acting between a tire and a road surface based on an output from the strain sensor.

13. The sensor equipped wheel support bearing assembly as claimed in claim 1, further comprising:
a cable forming a signal transmitting path from the sensor signal processing circuit to an external device;
a connector to physically bond and electrically connect between the sensor signal processing circuit and the cable; and
a cover fixed to the sensor mounting member to protect the connector.

* * * * *